United States Patent
Hatta et al.

(10) Patent No.: US 7,815,888 B2
(45) Date of Patent: Oct. 19, 2010

(54) METHOD OF PRODUCING SECONDARY BATTERY CATHODE MATERIAL, AND SECONDARY BATTERY

(75) Inventors: Naoki Hatta, Ichihara (JP); Shigeto Okada, 4-1-18-151, Yakuin, Chuo-ku, Fukuoka-shi, Fukuoka (JP) 810-0022; Jun-Ichi Yamaki, Kasuga-koen-Jutaku 103, 4-1-2, Kasuga-Koen, Kasuga-shi, Fukuoka (JP) 816-0811

(73) Assignees: Mitsui Engineering & Shipbuilding Co., Ltd., Tokyo (JP); Shigeto Okada, Fukuoka (JP); Jun-Ichi Yamaki, Fukuoka (JP)

( * ) Notice: Subject to any disclaimer, the term of this patent is extended or adjusted under 35 U.S.C. 154(b) by 340 days.

(21) Appl. No.: 10/485,671

(22) PCT Filed: Jul. 31, 2002

(86) PCT No.: PCT/JP02/07779

§ 371 (c)(1), (2), (4) Date: Jan. 30, 2004

(87) PCT Pub. No.: WO03/012899

PCT Pub. Date: Feb. 13, 2003

(65) Prior Publication Data

US 2004/0241546 A1 Dec. 2, 2004

(30) Foreign Application Priority Data

Jul. 31, 2001 (JP) ............................... 2001-231538

(51) Int. Cl.
*C01D 1/02* (2006.01)

(52) U.S. Cl. .............. 423/594.2; 423/593.1; 423/594.4; 423/594.6; 423/596; 429/218.1; 429/221; 429/222; 429/223; 429/224; 429/231.9; 429/231.95

(58) Field of Classification Search .............. 423/594.2, 423/594.4, 594.6, 596; 429/218, 221–224, 429/231.9, 231.85
See application file for complete search history.

(56) References Cited

U.S. PATENT DOCUMENTS 5,141,687 A * 8/1992 Haar et al. .................. 264/614

(Continued)

FOREIGN PATENT DOCUMENTS

CA 2307119 10/2000

(Continued)

OTHER PUBLICATIONS

Checked Internation Search Report.*

(Continued)

*Primary Examiner*—Steven Bos
*Assistant Examiner*—Paul A Wartalowicz
(74) *Attorney, Agent, or Firm*—Leason Ellis LLP

(57) ABSTRACT

Disclosed is a process for producing a secondary battery cathode material by calcining raw materials. The process is characterized by calcining the raw materials together with one or more substances, which are selected from the group consisting of hydrogen, water and water vapor, and conductive carbon and/or a substance, which can form conductive carbon by pyrolysis, added thereto. As crystals of the secondary battery cathode material obtained by this process have been controlled fine sizes, the secondary battery cathode material promotes movements of ions of an alkali metal led by lithium between the interiors of grains of the cathode material and an electrolyte to suppress polarization in an electrode reaction, and further, increases an area of contact between the positive material and a conductivity-imparting material to provide improved conductivity so that improvements are assured in voltage efficiency and specific battery capacity.

9 Claims, 7 Drawing Sheets

U.S. PATENT DOCUMENTS

| | | | |
|---|---|---|---|
| 5,942,204 A * | 8/1999 | Dunmead et al. | 423/440 |
| 6,051,173 A * | 4/2000 | Fasano et al. | 264/44 |
| 6,528,033 B1 * | 3/2003 | Barker et al. | 423/306 |
| 6,730,281 B2 * | 5/2004 | Barker et al. | 423/306 |
| 7,491,468 B2 * | 2/2009 | Okada et al. | 429/221 |
| 2002/0015894 A1 * | 2/2002 | Wariishi et al. | 429/314 |
| 2002/0039275 A1 * | 4/2002 | Takeuchi et al. | 361/504 |
| 2002/0195591 A1 | 12/2002 | Ravet et al. | |

FOREIGN PATENT DOCUMENTS

| | | | |
|---|---|---|---|
| CA | 2334386 | * | 10/2000 |
| EP | 0662727 | | 7/1995 |
| EP | 1049182 | | 11/2000 |
| EP | 1325525 | | 7/2003 |
| EP | 1325526 | | 7/2003 |
| EP | 1379468 | | 1/2004 |
| JP | 52-20395 | A1 | 2/1977 |
| JP | 63-58763 | A1 | 3/1988 |
| JP | 07-254412 | A1 | 10/1995 |
| JP | 09-293509 | | 11/1997 |
| JP | 09-293510 | | 11/1997 |
| JP | 11-67212 | A1 | 3/1999 |
| JP | 2000-340232 | | 12/2000 |
| JP | 2001-15111 | A1 | 1/2001 |
| JP | 2002-75364 | A1 | 3/2002 |
| JP | 2002-110163 | A1 | 4/2002 |
| JP | 2002-110165 | A1 | 4/2002 |
| JP | 2002-117848 | A1 | 4/2002 |
| JP | 2004-509058 | | 3/2004 |
| WO | WO-00/60679 | A1 | 10/2000 |
| WO | WO-02/27824 | | 4/2002 |

OTHER PUBLICATIONS

"Characterization of LiFePo4 as the cathode material for rechargeable lithium batteries" by Masayo Takahashi et al., NTT Telecommunications Energy Laboratories, pp. 349-345, Jul. 2001.

Chen, et al. "Carbon in LifePO4/C Composite Electrodes to Maximize Specific Energy, Volumetric Energy, and Tap Density" Hournel of the Electrochemical Society, (2002), 149; A1184-A1189.

* cited by examiner

METHOD OF PRODUCING SECONDARY BATTERY CATHODE MATERIAL, AND SECONDARY BATTERY

This is a U.S. national phase application under 35 U.S.C. §371 of International Patent Application No. PCT/JP02/07779 filed Jul. 31, 2002, and claims the benefit of Japanese Patent Application No. 2001-231538 filed Jul. 31, 2001, which is herein incorporated by reference. The International Application was published in Japanese on Feb. 13, 2003 as WO 03/012899 A1 under PCT Article 21(2).

FIELD OF THE INVENTION

The present invention relates to a process for producing cathode materials for secondary batteries, and also, to secondary batteries incorporating the cathode materials therein. More specifically, the present invention relates to a process for producing cathode materials useful in secondary batteries using, for instance, alkali metals such as lithium and sodium or compounds thereof as active materials and represented, for instance, by lithium metal batteries, lithium ion batteries, and lithium polymer batteries, and also, to secondary batteries incorporating therein the cathode materials produced by the process.

BACKGROUND OF THE INVENTION

In a cathode material used in a secondary battery such as a lithium metal battery, lithium ion battery, or lithium polymer battery, for example, a metal oxide, an oxide obtained from the metal oxide by partially substituting one or more metallic atoms therein, a phosphate such as $LiFePO_4$ and $LiCoPO_4$, or a sulfate such as $Fe_2(SO_4)_3$, an electrode redox reaction proceeds in the course of discharging or charging in such a way as accompanied by doping/undoping of ions of an alkali metal such as lithium. Recently, such secondary batteries are attracting considerable attention as large capacity batteries. In the cathode of such a battery, however, the velocity of alkali metal ions moving in the electrode material by solid-phase diffusion governs the rate of the electrode reaction, and therefore, substantial polarization generally takes place in the electrode reaction during charging or discharging, thereby making it difficult to charge or discharge at a relatively large current density. When this polarization is especially pronounced, the charging or discharging does not go on sufficiently under usual voltage and current density conditions, so that the secondary battery can be used at a substantially smaller capacity as compared to the theoretical capacity. Further, metal oxides, phosphates, sulfates, metal oxo-acid salts and the like, which are commonly used as such cathode materials, generally have low conductivity, and therefore, also act as a cause of increased polarization in the electrode reaction.

To alleviate the problems described above, it is effective to control the crystal grains of each cathode material to fine sizes so that alkali metal ions can easily move into and out of the crystal grains. The control of the crystal grains to such fine sizes leads to an improvement in conductivity because the contact area between a conductivity-imparting material commonly mixed with the cathode material, such as carbon black, and the cathode material increases, and as a result, the polarization in the cathode reaction can be reduced while making improvements in voltage efficiency and specific battery capacity.

Recently there have been made some reports on attempts conducted to achieve the above-described object. In attempts to obtain a cathode material with small grain size, the crystal growth of the cathode material was suppressed by using raw materials of high reactivity to lower the calcination temperature and at the same time, limiting the calcination time upon synthesizing the cathode material by calcination. For instance, there is a report that, upon production of $LiFePO_4$ as a cathode material for a lithium secondary battery, $LiOH \cdot H_2O$ of high reactivity was used as a source of lithium, calcination was carried out in argon for a relatively short time (about 24 hours) at 675° C.—which is lower than temperatures employed in the conventional technology (generally from 800 to 900° C. or so)—to inhibit sintering (an increase in the grain size) of the cathode material powder and as a result, a large discharge capacity was obtained (The 40th Battery Symposium, Report 3C14 (Preprint, p349, 1999); The Electrochemical Society of Japan).

Jp 2001-15111 A does not disclose any method for suppressing the crystal growth of an electrode material, but discloses a process for depositing carbon on surfaces of grains of a complex oxide (including a metal oxo-acid salt such as a sulfate, a phosphate, or a silicate) represented by the chemical formula of $A_aM_mZ_zO_oN_nF_f$ wherein A indicates an alkali metal; M indicates Fe, Mn, V, Ti, Mo, Nb, W or any other transition metal; Z indicates S, Se, P, As, Si, Ge, B, Sn or any other non-metal) to raise the surface conductivity. It further discloses that use of such composite material in the electrode systems of a battery or the like makes even and stable the electric fields around interfaces among grains of the complex oxide, a current collecting (conductivity-imparting) material and an electrolyte in the course of electrode redox reaction. As a procedure for depositing carbon on the surfaces of the grains of the complex oxide, this publication propose to make an organic material, which deposits carbon through pyrolysis (such as a polymer, monomer, or low molecular weight compound), exist together or to add carbon monoxide and then subject it to pyrolysis (the publication also disclose that the composite material of the complex oxide and surface-covering carbon can also be obtained by making the organic material exist together with raw materials for the complex oxide and thermally subjecting them to reactions at once under reducing conditions). In Jp2001-15111 A, the above described process and procedure realize an improvement in the conductivities of the surfaces of the complex oxide grains as mentioned above, and achieve high electrode performance such as high discharge capacity, for instance, when a Li polymer battery is formed with a composite material prepared by depositing carbon on the surfaces of grains of a cathode material such as $LiFePO_4$.

With an approach employing a lower temperature and/or a shorter time for calcination upon synthesizing a cathode material by calcination like the process described in Report 3C14 read at The 40th, Battery Symposium (Preprint, p349, 1999), calcination may not be performed sufficiently in some instances so that chemical changes may not proceed to give the final product or intermediate products may remain in the final product. This approach, therefore, has a limit as a method for controlling the grains of a cathode material to fine sizes.

The method disclosed in Jp 2001-15111 A is effective for improving the surface conductivity of an electrode material. However, it makes no mention whatsoever about the inhibition of crystal growth during the synthesis of the electrode material, and further, it does not contain any disclosure about a method for controlling the deposition of carbon on an electrode material more advantageously from the standpoint of the performance of electrodes.

For the reasons described above, there is an outstanding desire for the provision of a novel method for producing a cathode material for secondary batteries, which can assure the synthesis of a desired cathode material from raw materials by calcination and can also inhibit crystal growth of primary grains of the cathode material to control their sizes fine and to impart excellent conductivity. There is another outstanding desire for the provision of a high-performance secondary battery with improved voltage efficiency and specific battery capacity by optimally controlling grains of a cathode material to fine sizes and imparting conductivity to promote movements of ions of an alkali metal led by lithium between the interiors of grains of the cathode material and an electrolyte such that the polarization in the electrode reactions is suppressed and the contact area between the cathode material and the conductivity-imparting materials is increased to improve the conductivity.

SUMMARY OF THE INVENTION

A process according to the present invention for producing a secondary battery cathode material, which comprises calcining raw materials together with one or more substances, which are selected from the group consisting of hydrogen, water and water vapor, and conductive carbon and/or a substance, which can form conductive carbon by pyrolysis, added thereto.

The above-described process makes it possible to inhibit the crystal growth of primary grains of the cathode material and hence, to control the crystal grains of the resulting cathode material to fine sizes. Especially, the addition of a substance capable of forming conductive carbon by pyrolysis makes it possible to adequately control the state of deposition of the conductive carbon on the cathode material from the standpoint of the performance of the cathode, and hence, to provide the cathode material with high conductivity and stable electrode performances. Further, the process according to the present invention is free of the potential problem that the calcination of the raw materials may be insufficient and chemical changes may not proceed to the final product, or intermediate products may remain in the final product, and therefore, can surely synthesize the desired cathode material from the raw materials by calcination.

Further, hydrogen and/or water has strong crystal-growth inhibiting effect, as well as strong effect for improving the deposition of the substance, which can deposit conductive carbon by pyrolysis on the cathode material, and is also easy to handle and further, economical. The use of hydrogen and/or water is therefore efficient.

In a preferred embodiment of the present invention, the calcination step comprises a first stage ranging from room temperature to 300 or up to 450° C. and a second stage ranging from room temperature to a temperature at which the calcination is completed, and the one or more substances selected from the group consisting of hydrogen, water and water vapor are added during calcination in the second stage at temperatures of 500° C. and higher. By calcining the raw materials for the cathode material at the temperatures of 500° C. and higher in the second-stage calcination which feeding hydrogen and/or water (water or water vapor) as described above, it is possible to efficiently control primary grains of the resulting cathode material to fine sizes and further to have conductive carbon deposited on grains of the cathode material evenly and stably and hence, to obtain still higher electrode performance.

In another preferred embodiment of the process according to the present invention, the calcination is carried out after the conductive carbon is added to the raw materials before the calcination in the first stage. In this manner, the raw materials and the conductive carbon, which are to be subjected to reactions under heat, are allowed to contact each other for longer time, and owing to diffusion of the cathode-material-constituting elements occurring through the reactions during the contact, the cathode material enters grain boundaries of carbon, so that a more homogeneous and more stable carbon-cathode material composite material can be formed while effectively preventing sintering of the grains of the cathode materials.

In a further preferred embodiment of the process according to the present invention, the calcination in the second stage is carried out after adding the substance, which can form conductive carbon by pyrolysis, to the raw materials which have been subjected to the calcination in the first stage.

As most of gas generated by the decomposition of the raw materials in the calcination step is released during the calcination in the first stage (pre-calcination), the addition of the substance, which can form conductive carbon by pyrolysis, to the raw materials which have been subjected to calcination in the first stage makes it possible to prevent the substance, which can form conductive carbon by pyrolysis, from foaming by the gas during the calcination in the secondary stage (main calcination). Therefore, the substance, which can form conductive carbon by pyrolysis is allowed to spread in a melted state over surfaces of the cathode material more evenly so that pyrolytic carbon can be deposited more evenly. As a consequence, the resultant cathode material is provided with still better surface conductivity, and the grains of the cathode material and the coatings of the conductive carbon are firmly and stably bonded together. When hydrogen (including that generated from water) is brought into contact during this step with the substance which is caused to melt and pyrolytically decompose by the heating, the melt viscosity of the substance appears to be lowered presumably by an addition reaction of hydrogen, thereby realizing the deposition of carbon in a still better state.

In a still further preferred embodeiment of the process according to the present invention, the cathode material is a compound which includes an alkali metal, a transition metal and oxygen and can be synthesized by calcining the raw materials in the absence of oxygen gas (which may hereinafter be referred to as a "transition metal compound").

When the raw materials are calcined with the addition of the one or more substances selected from the group consisting of hydrogen, water, and water vapor in the absence of oxygen gas, the crystal grains of the cathode material are obtained in a still finer form, and especially, the state of the deposition of the substance capable of forming conductive carbon by pyrolysis can be controlled well from the standpoint of cathode performance. Further, as hydrogen also has reducing property, oxidized-form impurities are reduced into the target cathode material. These oxidized-form impurities may be formed by oxidation with residual oxygen which inevitably occurs even in calcination in the absence of oxygen gas or may be inherently contained in the raw materials. Examples of such oxidized-form impurities include $Fe^{3+}PO_4$, lithium-deficient, oxidized-form impurity, and $Fe_2O_3$, oxidized-form oxide in the cathode material $LiFe^{2+}PO_4$. Mixing of these impurities, generally leads to a reduction of the discharge capacity of a battery. Therefore, it is also possible to prevent such oxidized-form impurities from mixing in the cathode material by the action of hydrogen having the reducing property. When water or water vapor (hereinafter referred to as "water") is added, conductive carbon or the substance capable of forming conductive carbon by pyrolysis and the water react to each other during calcination to generate hydrogen, so that the water can bring about a similar effect as the so-called water gas reaction.

Depending upon selection of a raw material, the transition metal element in the raw material may have a higher valence than the transition metal element in the cathode material, and in that case, only with the step of calcination in the absence of oxygen gas, the transition metal element in the raw material may not be rendered to have the same valence as the transition metal element in the target cathode material. Even in such a case, the addition of hydrogen (or hydrogen produced indirectly from water) having the reducing property required and sufficient for the raw material makes it possible to sufficiently reduce the resulting cathode material to a sufficient degree as required, and therefore, the target cathode material can be obtained.

In a still further preferred embodiment of the process according to the present invention, the substance which can form conductive carbon by pyrolysis is a bitumen. The bitumen forms conductive carbon through pyrolysis, so that it can impart conductivity to the cathode material to be obtained through calcination.

More preferably, the bitumen is a coal pitch having a softening temperature in a range of from 80° C. to 350° C. and a pyrolytic weight-loss initiation temperature in a range of from 350° C. to 450° C. and capable of depositing conductive carbon by pyrolysis and calcination at a temperature of from 500° C. to 800° C. The coal pitch having such properties as described above is very economical, melts and spreads evenly over the surfaces of raw material grains under calcination, and after pyrolysis, turns into a carbon deposit that exhibits high conductivity. The coal pitch is, therefore, a substance having excellent properties as a substance capable of forming conductive carbon. Further, the addition of hydrogen in the step, during which the coal pitch is melted and pyrolyzed by heating, makes it possible to deposit conductive carbon on the resulting cathode material grains in a still better form from the standpoint of cathode performance.

In a still further preferred embodiment of the process according to the present invention, the substance which can form conductive carbon by pyrolysis is a saccharide. The use of the saccharide can simultaneously bring about still better crystal-growth inhibiting effect and conductivity imparting effect. The saccharide is presumed not only to form conductive carbon through pyrolysis and to impart conductivity to the cathode material but also to have crystal-growth inhibiting effect owing to a strong interaction of many hydroxyl groups, which are contained in the saccharide, with the raw materials and the surfaces of the resulting cathode material grains. More preferably, the saccharide undergoes decomposition in a temperature range of 250° C. and higher but lower than 500° C., takes an at least partially fused form once in the course of heating from 150° C. to decomposition, and further, forms conductive carbon by pyrolysis and calcination in a temperature range from 500° C. and higher but not higher than 800° C. The saccharide having such specific properties is appropriately coated over the surfaces of the cathode material grains owing to it melting during the reactions under heating, so that conductive carbon can be properly deposited on the surfaces of the cathode material grains produced after the pyrolysis. As described above, the crystal growth is inhibited during this step. The saccharide having the above-described specific properties, therefore, exhibits outstanding crystal-growth inhibiting effect and conductivity imparting effect. Further, the addition of hydrogen in the step, in which the saccharide is caused to melt and thermally decompose by heating, allows conductive carbon to deposit on the resulting cathode material grains in a still improved, better form from the standpoint of cathode performance.

In a still further preferred embodiment of the process according to the present invention, the cathode material is a substance represented by a formula of $M_{(1)a}M_{(2)x}A_yO_z$ wherein $M_{(1)}$ represents Li or Na; $M_{(2)}$ represents Fe(II), Co(II), Mn(II), Ni(II), V(II) or Cu(II); A represents P or S; a stands for a number selected from 0 to 3; x stands for a number selected from 1 to 2; y stands for a number selected from 1 to 3; and z stands for a number selected from 4 to 12, or a complex thereof, and in an especially preferred embodiment, the cathode material is a substance represented by a formula of $Li_qFePO_4$, $Li_qCoPO_4$ or $Li_qMnPO_4$ wherein q stands for a number selected from 0 to 1, or a complex thereof.

For such a cathode material, it is possible to use as a raw material a compound which contains a transition element having the same valence as in the target cathode material, and the target cathode material can be synthesized from the raw material by calcination under oxygen-free conditions (for instance, in an inert gas). Therefore, even when hydrogen gas having the reducing property or the like is added during the calcination, it is possible to prevent the gas from being completely burnt and consumed, and the calcination can be controlled stable without any significant localized temperature increase. In addition, especially in the case of such a cathode material system, the valence of the central metal element (such as Fe, Co, Mn, Ni, V, Cu or the like) is less susceptible to the further lowering by the reducing property of hydrogen or the like, so that impurities (for instance, the metal state) are hardly formed in the cathode material.

The secondary battery according to the present invention has as an element thereof the cathode material produced by the process according to the present invention. In the secondary battery making use of the cathode material produced by the process according to the present invention, the crystal grains of the cathode materials are kept fine so that, when the cathode material is subjected to electrochemical oxidation/reduction accompanied by undoping/doping of alkali metal ions led by lithium ions at an interface between the cathode material and the electrolyte, the cathode material has a large surface area and alkali metal ions can easily move through the interfaces between the interiors of the cathode material grains and the electrolyte. Polarization in electrode reactions is suppressed accordingly. Further, the contact between the conductivity-imparting material commonly mixed in the cathode material, such as carbon black, and the cathode material has been substantially improved, so that the conductivity has been improved. The secondary battery, therefore, features a high coefficient of utilization of the cathode material as an active material, has small cell resistance, and has been markedly improved in voltage efficiency and specific battery discharge capacity.

DETAILED DESCRIPTION OF THE INVENTION

Figure 1:
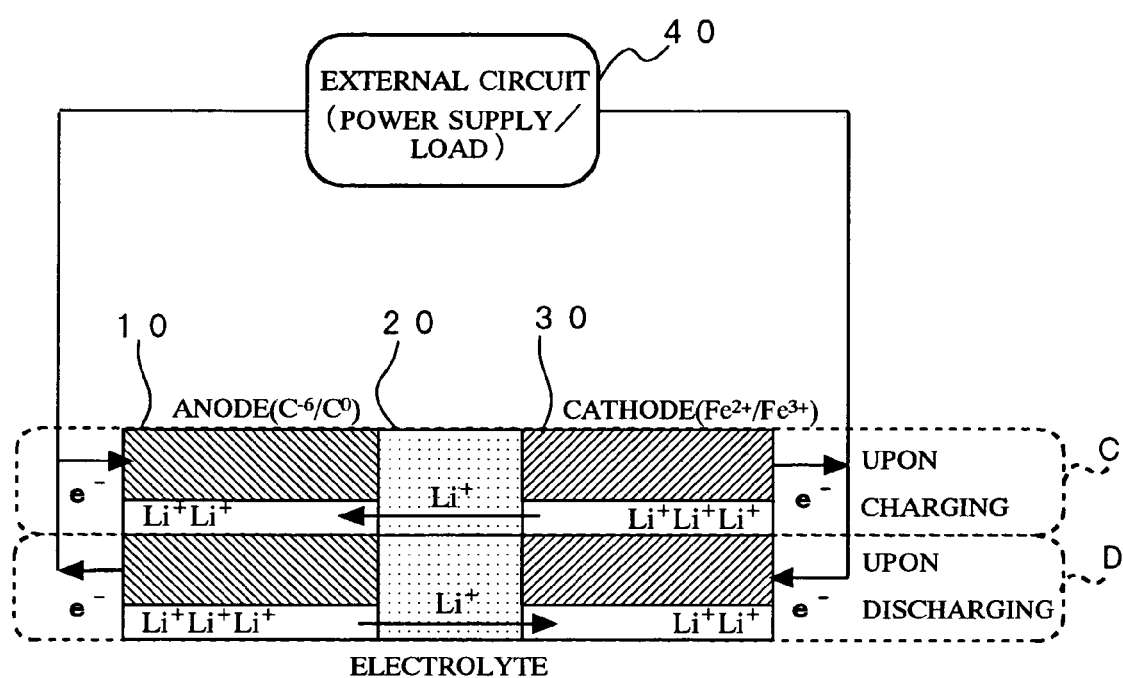
FIG. 1 is a simplified schematic diagram useful in describing the charge/discharge behavior of a secondary battery.

The process according to the present invention for producing secondary battery cathode material is practiced by calcing raw materials with one or more substances, which are selected from the group consisting of hydrogen, water, and water vapor and conductive carbon and/or a substance capable of forming conductive carbon by pyrolysis (hereinafter referred to as a "conductive carbon precursor") added thereto.

The expression "adding" hydrogen or water vapor, which is gas, as used herein includes conducting calcination of the raw materials in the presence of a gas such as hydrogen (in other words, under a hydrogen atmosphere).

<Cathode Material>

Preferred as the cathode material in the present invention is a compound which includes an alkali metal, a transition metal and oxygen and can be synthesized by calcining the raw materials in the absence of oxygen gas. More specifically, examples of the cathode material include the substances represented by the formula of $M_{(1)a}M_{(2)x}A_y O_z$ wherein $M_{(1)}$ represents Li or Na, $M_{(2)}$ represents Fe (II), Co (II), Mn (II), Ni (II), V (II) or Cu (II), A represents P or S, a stands for a number selected from 0 to 3, x stands for a number selected from 1 to 2, y stands for a number selected from 1 to 3, and z stands for a number selected from 4 to 12, and complexes thereof. The Roman number "(II)", "(III)" or the like as used herein indicates a valence of the transition metal element $M_{(2)}$, while x, y and z take values satisfying the stoichiometrically neutral (electrical) condition of the material. It is to be noted that $M_{(2)}$ includes combinations of plural transition metal elements having the same valence among those exemplified above [for instance, those containing Fe(II)Co(II) or Fe(II)Mn(II) as $M_{(2)}$. In this case, the total number of moles of Fe(II) and Co(II) or of Fe(II) and Mn(II) is at a ratio of x moles against 1 mole of Li (in the case where the $M_{(1)}$ is Li and a is 1)].

The substances can each be synthesized generally from its raw materials by calcination in the absence of oxygen gas (specifically, for example, in an inert gas atmosphere such as argon, nitrogen, or helium) and, when its crystal framework structure (which is generally of the spinel type, the olivine type, the NASICON type or the like) does not undergo any substantial change when subjected to electrochemical oxidation-reduction the substance can be used as a cathode material for alkali metal secondary batteries which can be charged and discharged repeatedly. As the cathode material, the substance, in its own state, is in a state corresponding to a discharged state, and by electrochemical oxidation at its interface with an electrolyte, the central metal element $M_{(2)}$ is oxidized with undoping of the alkali metal $M_{(1)}$ so that the substance is brought into a charged state. When subjected to electrochemical reduction from the charged state, the central metal element $M_{(2)}$ is reduced with redoping of the alkali metal $M_{(1)}$ so that the substance returns to the initial state, that is, to the discharged state.

Preferred examples of the cathode material include, the substances represented by the formulas of $Li_qFePO_4$, $Li_qCoPO_4$, and $Li_qMnPO_4$ wherein q stands for a number selected from 0 to 1, respectively, and complex thereof, and the substance represented by the formula of $Li_qFePO_4$ wherein q has the same meaning as defined above is especially preferred. These substances can each be synthesized from its raw materials by means of calcination at a temperature of about 900° C. or lower in the absence of oxygen gas, and can be suitably used as cathode materials for lithium secondary batteries such as, for instance, lithium batteries, lithium ion batteries, and lithium polymer batteries.

<Raw Materials>

As the raw materials for each cathode material, a compound (transition metal compound) including at least an alkali metal, the transition metal and oxygen or a combination of a plurality of such compounds can be used. Generally, the transition metal element in a raw material originally has the same valence as the transition metal element in the cathode material or, during the step in which the raw materials are calcined in the absence of oxygen gas at a predetermined calcination temperature for a predetermined time, the transition metal is reduced to have the same valence as the transition metal element in the cathode material. Calcination of the raw materials with hydrogen or the like added thereto in this step makes it possible to obtain in cathode material with finer crystal grains.

More specific examples of the raw materials for the cathode material, which are usable as raw materials for the introduction of alkali metals, include hydroxides such as LiOH and NaOH; carbonates or hydrogencarbonates such as $Li_2CO_3$, $Na_2CO_3$ and $NaHCO_3$; halides including chlorides such as LiCl and NaCl; nitrates such as $LiNO_3$ and $NaNO_3$; and further, such decomposable, volatile compounds (such as organic acid salts) as permitting only alkali metals to remain in the target cathode materials. When the target cathode material is a phosphate, a phosphate or hydrogenphosphate such as $Li_3PO_4$, $Li_2HPO_4$, $LiH_2PO_4$, $Na_3PO_4$, $Na_2HPO_4$ or $NaH_2PO_4$ can be used and, when the target cathode material is a sulfate, a sulfate or hydrogensulfate such as $Li_2SO_4$, $LiHSO_4$, $Na_2SO_4$ or $NaHSO_4$ can be used.

Usable examples of a raw material for introducing a transition metal such as Fe, Co, Mn or V, include hydroxides, carbonates and hydrogencarbonates, halides such as chlorides, nitrates, and further, such decomposable, volatile compounds as permitting only transition metals to remain in the target cathode materials (e.g., organic oxide salts such as oxalates and acetates, and organic complexes such as acetylacetone complexes and metallocene complexes) can be used. When the target cathode material is a phosphate, a phosphate or hydrogenphosphate can be used and, when the target cathode material is a sulfate, a sulfate or hydrogensulfate, or a double salt of such a transition metal oxy-acid salt with ammonium or the like can be used.

When the target cathode material is a phosphate, phosphoric acid anhydride $P_2O_5$, phosphoric acid $H_3PO_4$, or such a decomposable, volatile phosphate or hydrogenphosphate (e.g., an ammonium salt such as $(NH_4)_2HPO_4$, $NH_4H_2PO_4$ or $(NH_4)_3PO_4$) as permitting only the phosphate ion remain in the target cathode material can be used and, when the target cathode material is a sulfate, sulfuric acid $H_2SO_4$ or such a decomposable, volatile sulfate or hydrogensulfate (e.g., an ammonium salt such as $NH_4HSO_4$ or $(NH_4)_2SO_4$) as permitting only the sulfate ion to remain in the target cathode material can also be used.

When these raw materials contain any element or material which is not preferred to remain in the target cathode material, the element or material is required to decompose or evaporate during calcination. Further, when the target product is, for instance, a phosphate, any non-volatile oxo-acid salt other than phosphate ions or the like should not be used as a raw material obviously. These raw materials may be used in the form of hydrates (e.g., $LiOH \cdot H_2O$, $Fe_3(PO_4)_2 \cdot 8H_2O$ and the like), but reference to such hydrates was all omitted in the foregoing description.

The raw materials for the cathode material may be subjected to such processing as pulverizing, mixing with each other (including conductive carbon which may be added in some cases), and kneading as needed before calcination. Further, when the calcination is carried out in two stages and a conductive carbon precursor (which is a substance capable of forming conductive carbon by pyrolysis) is added after calcination in the first stage, the raw materials may also be subjected to such processing as pulverizing, mixing, kneading and the like.

When the above-described raw materials are calcined in the presence of hydrogen or the like, no particular problem arises in general. Care should, however, be exercised in the selection and combination of the raw materials to avoid that they would rapidly react wish each other in an early stage of calcination to fail in obtaining the target cathode material or to result in the formation of impurities.

<Supply of Hydrogen or the Like>

In the process according to the present invention, the raw materials are calcined while a predetermined amount of hydrogen or water (water, water vapor or the like) is continuously fed together with an inert gas into a furnace. Hydrogen or water is added, for instance, throughout the entire period of the calcination step, or especially at temperatures ranging from a temperature of 500° C. or lower to a temperature at which the calcination is completed, preferably temperatures ranging from a temperature of 400° C. or lower to a temperature at which the calcination is completed, and more preferably at calcination temperatures ranging from a temperature of 300° C. or lower to a temperature at which the calcination is completed.

When hydrogen which is in a gas form is used, hydrogen can be fed in a necessary and sufficient quantity by choosing adequate temperature range and feeding period in the calcination step ranging from 300 to 900° C. as generally employed, although the temperature range varies depending upon the target cathode material. It is, therefore, possible to effectively induce the addition to oxygen atoms on surfaces of the cathode material, deoxygenation from the surfaces, reduction of the cathode material and the like.

In the process according to the present invention, it is preferred to add hydrogen in a temperature range of from at least 500° C. and higher upon calcination. For example, it is preferred to add hydrogen in a temperature range of from a temperature 500° C. or lower to a temperature at which the calcination is completed. More preferably, hydrogen can be added in a temperature range of from a temperature of 400° C. or lower to the temperature at which the calcination is completed, and desirably a temperature range of from a temperature of 300° C. or lower to the temperature at which the calcination is completed. In this range, the inhibition of crystal growth effectively occurs presumably for reasons to be described subsequently herein. The volumetric concentration of hydrogen in the atmosphere in the above-described temperature range can be set at 0.1% or higher but 20% or lower, preferably at 1% or higher but 10% or lower. This hydrogen concentration makes it possible to adequately control the crystal growth of the cathode material which comprises the transition metal compound.

Studies by the present inventors have found that, when the raw materials for the cathode material are calcined in the absence of oxygen gas while feeding hydrogen and/or water, a slight disorder occurs in the crystallinity of the resulting cathode material grains, thereby forming primary grains with still smaller grain sizes. Namely, it has been substantiated that hydrogen or water functions as an effective crystal growth inhibitor. This mechanism has not been elucidated yet, but it may be considered that on the growing surfaces of cathode material crystal grains synthesized and growing from the raw materials during the calcination, hydrogen atoms bond to surface oxygen atoms to form hydroxyl groups or water molecules formed from such hydroxyl groups separate back to create a disorder or discordance in the crystal surface structure and hence, to inhibit the growth of the grains.

Water has crystal-growth inhibiting effect like hydrogen. The reason has not been clarified yet, but presumably as in the case where hydrogen gas is added, water molecules may cut metal-oxygen bonds on the surfaces of the raw materials and the cathode material, or water molecules may deposit on the surfaces to form hydroxyl groups, and hence, to delay the crystal growth. Further, when water vapor comes into contact with conductive carbon or a substance capable of forming conductive carbon by pyrolysis at a high temperature (about 500° C. or higher), hydrogen and carbon monoxide are generated through the so-called water gas reaction, and the generated hydrogen also bring about the crystal-growth inhibiting effect and the reducing effect. Namely, continuous feeding of water makes it possible to continuously generate a larger quantity of hydrogen without failure by the water gas reaction even in a high temperature range of 500° C. and higher, and therefore, to exhibit the crystal-growth inhibiting effect and the reducing effect to maximum extents.

As a feeding method of water, water can be fed by spraying it into a furnace, preferably by prevaporizing it and feeding the same in the form of water vapor. The feeding temperature range and feeding amount of water can be set as in the case of hydrogen. Namely, it is preferred to feed water in a temperature range of from a temperature of at least 500° C. or higher to the temperature, at which the calcination is completed, upon calcination. Upon calcination, water may be added, for instance, in a temperature range of from a temperature of 500° C. or lower to the temperature at which the calcination is completed, more preferably in a temperature range of from a temperature of 400° C. or lower to the temperature at which the calcination is completed, desirably in a temperature range of around 300° C. to the temperature at which the calcination is completed.

Presumably, the inhibition of crystal growth may effectively occur because the formation of hydroxyl groups easily occurs in the above temperature range (as addition of hydrogen generated through the water gas reaction onto the surface element of the transition metal compound takes place especially at temperatures 500° C. and higher). The volumetric concentration of water vapor in the atmosphere can be set at about 0.1% or higher but 20% or lower in the above-described temperature range, and more preferably at about 1% or higher but 10% or lower. At this concentration of water vapor, the crystal growth of the cathode material can be adequately inhibited.

<Conductive Carbon>

Examples of the conductive carbon for use in the present invention include graphitic carbon and amorphous carbon. It is to be noted that graphitic carbon and amorphous carbon include so-called soot and carbon black.

<Conductive Carbon Precursor (Substance Capable of Forming Conductive Carbon by Pyrolysis)>

Examples of the conductive carbon precursor include bitumen (including so-called asphalt and pitches available from coal or oil sludge), saccharides, styrene-divinylbenzene copolymer, ABS resin, phenol resin, other crosslinked polymers containing aromatic groups. Among these, bitumen (especially, refined one, so-called coal pitch) and saccharides are preferred. These bitumen and saccharides form conductive carbon by pyrolysis to impart conductivity to the cathode material. In particular, refined coal pitch is very economical, melts and spreads evenly over the surfaces of raw material grains during calcination, and after calcination at a relatively low temperature (650° C. to 800° C.) subsequent to a pyrolysis step, turns into deposits of carbon which exhibits high conductivity. In the case of a saccharide, a large number of hydroxyl groups contained in the saccharide actively react with the raw materials and the surfaces of the resultant cathode material grains and thus, also have crystal-growth inhibiting effect, so that the use of the saccharide can provide still better crystal-growth inhibiting effect and conductivity-imparting effect.

Suitably usable as the refined coal pitch is one having a softening point in a range of from 80° C. to 350° C. and a pyrolytic weight-loss initiation temperature in a range of from 350° C. to 450° C. and capable of forming conductive carbon by pyrolysis and calcination at temperatures of from 500° C. to 800° C. In order to further heighten the cathode performance, refined coal pitch the softening point of which is in a range of from 200° C. to 300° C. is more preferred. Needless to say, impurities contained in the refined coal pitch should not adversely affect the cathode performance, and refined coal pitch having an ash content not higher than 5000 ppm is particularly preferred.

Particularly preferred as the saccharide is one that decomposes in a temperature range of not less than 250° C. but lower than 500° C., takes an at least partially melted form once in the course of heating from 150° C. up to the above-described temperature range, and further, forms conductive carbon by pyrolysis and calcination from 500° C. or higher to 800° C. or lower, because the saccharide having such specific properties is caused to melt to adequately the surfaces of cathode material grains resulting by the reaction under the heating such that conductive carbon properly deposits on the surface of the cathode material grains formed after the pyrolysis and crystals growth is inhibited during this step as described above. In order to provide good conductivity, the pyrolysis temperature can be set preferably in a range of 570° C. or higher but 850° C. or lower, more preferably in a range of from 650° C. or higher but 800° C. or lower although it depends upon the kind of the cathode material. Further, the above-described saccharide may desirably form by calcination at least 15% by weight, preferably 20% by weight or more of conductive carbon based the dry weight of the saccharide before the calcination, because the quantitative control of the resulting conductive carbon can be facilitated. Examples of the saccharide having such properties includes oligosaccharides such as dextrin; and high-molecular saccharides such as soluble starches and lowly crosslinked starches prone to melting upon heating (for example, starches containing 50% or more amylose).

<Addition and Calcination of Conductive Carbon Precursor or the Like>

The conductive carbon or the conductive carbon precursor typified by refined coal pitch, a saccharide or the like is added and mixed into the raw materials (with the intermediate product contained therein) at an adequate timing. Upon addition, operations for sufficiently mixing the conductive carbon or conductive carbon precursor with the raw materials, for example, pulverization and kneading may be carried out as needed.

The conductive carbon or the conductive carbon precursor may be added such that the concentration by weight of conductive carbon in the resulting cathode material falls within a range of 0.1% or higher but 10% or lower, preferably within a range of 0.5% or higher but 7% or lower, more preferably within a range of 1% or higher but 5% or lower.

Calcination can be conducted, by selecting an appropriate temperature range and calcination time in a generally-employed calcination step ranging from 300° C. to 900° C., although the calcination conditions vary depending upon the target cathode material. Further, the calcination is preferably carried out in the absence of oxygen gas to prevent formation of oxidized-form impurities and also, to promote reduction of any remaining oxidized-form impurities.

Although the calcination can be carried out only by a simple step consisting of the heating and its subsequent temperature retention in series, it is preferred to conduct the calcination by dividing it into two stages, that is, a calcination step in a lower temperature range (generally in a temperature range of from room temperature to from 300 to 450° C.; which may hereinafter be referred to as "pre-calcination") as a first step and a calcination step in a higher temperature range (generally in a range of from room temperature to the temperature at which the calcination is completed (about from 500 to 800° C.); which may hereinafter be referred to as "main calcination") as a second step. In this case, mixing of conductive carbon or the conductive carbon precursor at a timing to be described below can provide the resulting cathode with still improved performance.

In the pre-calcination, the raw materials for the cathode material are heated to react into a form intermediate to the final cathode material. In many instances, this reaction is accompanied by production of pyrolytic gas. As the temperature at which the pre-calcination should be finished, a temperature is selected such that most of the resulting gas has been released but the reaction into the cathode material as the final product has not proceeded fully (in other words, a temperature at which there is still a room for the constituent elements in the cathode material to undergo re-diffusion and even distribution in the second stage, i.e., the main calcination in the higher temperature range).

In the main calcination following the pre-calcination, the temperature is raised to and retained in such a temperature range that the re-diffusion and even distribution of the constituent elements occurs, the reaction into the cathode material is completed, and moreover, crystal growth by sintering or the like can be prevented as much as possible.

In the case of addition of the carbon which already has conductivity and no longer undergoes any substantial weight loss or change in form or no longer cause any substantial gas production by heating (conductive carbon; for example, graphitic carbon or amorphous carbon such as soot or carbon black), it is preferred that a predetermined amount of such carbon is mixed with the raw materials before the pre-calcination and the series of calcination steps is started from the pre-calcination. This makes it possible to have the raw materials and the conductive carbon kept contacted for a long time during the reaction under heat, and during this contact time, the constituent elements of the cathode material resulting by the reaction are allowed to diffuse so that the cathode material enters the grain boundaries of the conductive carbon to form a more homogeneous and more stable carbon-cathode material composite material and also, to effectively prevent co-sintering of cathode material grains.

When a conductive carbon precursor, especially coal pitch or saccharides, which is caused to melt by heating is used, it is more preferred for the provision of a high-performance cathode materials to conduct the main calcination after adding the conductive carbon precursor to the pre-calcined raw materials (which have been converted into the form of an intermediate product with the production of gas from the raw materials having been completed mostly). This means to include the additional step of the conductive carbon precursor to the raw materials between the pre-calcination and the main calcination in the calcination step.

This makes it possible to prevent the conductive carbon precursor such as coal pitch or saccharide, which undergoes melting and pyrolysis by heating, from foaming due to the gas given off from the raw materials, so that the carbon precursor is allowed to spread evenly on the surface of the cathode material and pyrolytic carbon is allowed to deposit still more evenly.

This is attributed to the following reason. Most of the gas produced from the decomposition of the raw materials is released by the pre-calcination, so that substantially no gas production occurs in the main calcination, and the addition of the conductive carbon precursor at a timing after the pre-calcination enables even deposition of conductive carbon. As a result, the resulting cathode material is provided with still better surface conductivity, and the grains of the cathode material and the coatings of the conductive carbon are firmly and stably bonded together. If the conductive carbon precursor is added to the raw materials conversely before the pre-calcination, the gas is actively given off from the raw material in the pre-calcination so that the conductive carbon precursor which is in a molten state and has not been pyrolyzed yet entirely undergoes foaming and may not deposit evenly.

When calcination is conducted by adding the conductive carbon precursor to the raw materials before their calcination [in the process in which calcination is conducted in two stages, to the raw materials before the calcination in the first stage or to the raw materials after the calcination in the first stage (the intermediate)], addition of hydrogen (including that produced from the reaction of the water with the conductive carbon precursor such as a coal pitch or a saccharide) allows carbon to deposit evenly on the resulting cathode material. This mechanism has not been elucidated yet, but the addition of hydrogen to the conductive carbon precursor in its molten state is presumed to be effective in lowering its viscosity and allowing the conductive carbon to deposit evenly on the grains of the cathode material.

When refined coal pitch—which has a softening point in the range of from 80° C. to 350° C. and a pyrolytic weight-loss initiation temperature in the range of from 350° C. to 450° C. and forms conductive carbon by pyrolysis at temperatures of from 500° C. or higher to 800° C. or lower—is used as an illustrative conductive carbon precursor, action of hydrogen (including that formed from the water) on the coal pitch already converted into the molten form in the course of the calcination lowers the viscosity of the coal pitch and provides the coal pitch with improved fluidity, thereby making it possible to deposition of conductive carbon with an extremely uniform and small coating thickness on the resulting cathode material.

The hydrogen (including that formed from the water) may, therefore, be added in a temperature range of from at least 500° C. to the temperature at which the calcination is completed, preferably from 400° C. or lower to the temperature at which the calcination is completed, more preferably from 300° C. to the temperature at which the calcination is completed, or throughout the main calcination. Further, addition of hydrogen in the pre-calcination is expected to bring about such effect as preventing the cathode material from oxidation owing to the reducing property of hydrogen.

As a matter of fact, the conductive carbon precursor can be added to the raw materials before the pre-calcination, and even in this case, reasonable cathode-performance improving effects can also be obtained.

Addition of both conductive carbon and a conductive carbon precursor, for example, a substance capable of undergoing melting and pyrolysis when heated, such as coal pitch or a saccharide, is also effective for obtaining a cathode material with high cathode performances. In this case, for the reasons described above, it is preferred to add the conductive carbon to the raw materials before the pre-calcination, and to add the substance capable of undergoing melting and pyrolysis when heated such as coal pitch or a saccharide, to the raw materials after the pre-calcination.

An example of the process according to the present invention for the production of a cathode material can be outlined as will be described next.

Firstly, in the case that a single calcination step is adopted, [a step of adding conductive carbon and/or a conductive carbon precursor (which may include its pulverization, mixing, kneading, and the like together with the raw materials as needed)] and [a calcination step] are carried out in this order. In the above case, hydrogen or water is added at the above-described timing in at least a part of the calcination step or throughout the calcination step.

In the case that, in the process in which the calcination is conducted in two stages, a conductive carbon precursor is added after the pre-calcination in the first stage, the process is carried out in the order of [a step of performing pulverization, mixing, kneading and the like of the raw materials as needed], [the step of calcination in the first stage], [the step of addition of the conductive carbon precursor (which may include pulverization, mixing, kneading and the like as needed)], and [the step of main calcination in the second stage].

In the case that, in the process in which the calcination is conducted in two stages, conductive carbon is added before the pre-calcination in the first stage and a conductive carbon precursor is added after the pre-calcination in the first stage, the process is carried out in the order of [a step of adding the conductive carbon (which may include its pulverization, mixing, kneading and the like together with the raw materials as needed)], [the step of pre-calcination in the first stage], [addition of the conductive carbon precursor (which may include its pulverization, mixing, kneading and the like together with the raw materials (intermediate) as needed], and [the step of main calcination in the second stage].

In the case that conductive carbon is added before the pre-calcination in the first stage of the process in which the calcination is conducted in two stages, the process is carried out in the order of [a step of adding the conductive carbon (which may include its pulverization, mixing, kneading and the like together with the raw materials as needed)], [a step of pre-calcination in the first stage], [a step of conducting pulverization, mixing, kneading and the like of the raw materials (intermediate) as needed)], and [a step of main calcination in the second stage].

In the above cases, hydrogen or water is added at the above-described timing at least in a part of the step of main calcination in the second stage, desirably throughout the step of main calcination in the second stage, more desirably also at least in a part of the step of pre-calcination in the first stage in addition of its incorporation throughout the step of main calcination in the second stage.

<Secondary Batteries>

Examples of a secondary battery making use of the cathode material according to the present invention obtained as described above include lithium metal batteries, lithium ion batteries, and lithium polymer batteries.

Taking lithium as an illustrative alkali metal, a description will hereinafter be made of a fundamental construction of an alkali ion battery. A lithium ion battery is a secondary battery characterized in that $Li^+$ ions reciprocate between an anode active material and a cathode active material upon charging and discharging (refer to FIG. 1) as commonly called "the rocking chair type", "the badminton shuttlecock type" or the like. In FIG. 1, designated at reference numeral 10 is an anode, at reference numeral 20 an electrolyte, at reference numeral 30 a cathode, at reference numeral 40 an external circuit (power supply/load), at reference sign C a charging state (upon charging), and at reference sign D a discharging state (upon discharging).

Upon charging, $Li^+$ ions are introduced into the anode (carbon such as graphite is used in currently-available systems) to form an intercalation compound (at this time, the anode carbon is reduced while the $Li^+$-extracted cathode is oxidized). Upon discharging, on the other hand, $Li^+$ ions are introduced into the cathode (an iron(II)/iron(III) redox system such as lithium iron phosphate is shown by way of example in FIG. 1 although the main stream of these days is the cobalt oxide system) to form an iron compound-lithium complex (at this time, the iron in the cathode is reduced which the $Li^+$-extracted anode is oxidized to return to graphite or the like). During charging and discharging, $Li^+$ ions reciprocate through the electrolyte and at the same time, transport electrical charges. Usable examples of the electrolyte include liquid electrolytes with electrolyte salts such as $LiPF_6$, $LiCF_3SO_3$ and $LiClO_4$ dissolved in mixed solvents of cyclic organic solvents such as ethylene carbonate, propylene carbonate and γ-butyrolactone and chain organic solvents such as dimethyl carbonate and ethyl methyl carbonate, respectively; gel electrolytes formed of polymer gel substances impregnated with these liquid electrolytes, respectively; and solid polymer electrolytes such as partially-crosslinked polyethylene oxide impregnated with the above-described electrolytes, respectively. When a liquid electrolyte is used, the cathode and the anode are insulated from each other by interposing therebetween a porous separator made of a polyolefin or the like to prevent them from short-circuiting in the battery. Used as the cathode and anode are those produced by adding predetermined amounts of a conductivity-imparting material such as carbon black to a cathode material and anode material, respectively, adding a binder, for example, a synthetic resin such as polytetrafluoroethylene, polyvinylidene fluoride or fluorocarbon resin or a synthetic rubber such as ethylene propylene rubber, and, if necessary, further adding a polar organic solvent to the resultant mixtures, respectively, separately kneading the thus-prepared mixtures, and then forming the thus kneaded masses into thin membranes, respectively. The cathode and anode are combined with metal foil or metal screens as current collections to construct a battery. When metal lithium is used for the anode, on the other hand, changes to $Li(O)$ and $Li^+$ take place at the anode concurrently with charging and discharging, respectively, to form a battery.

Studies by the present inventors have found that, when the raw materials for the cathode material are calcined in the absence of oxygen gas while feeding hydrogen and/or water, a slight disorder occurs in the crystallinity of the resulting cathode material grains, thereby forming primary grains with still smaller grain sizes. Namely, it has been substantiated that hydrogen or water functions as an effective crystal growth inhibitor. This mechanism has not been elucidated yet, but it may be considered that on the growing surfaces of cathode material crystal grains synthesized and growing from the raw materials during the calcination, hydrogen atoms bond to surface oxygen atoms and water molecules cut or are added to surface metal-oxygen bonds to form hydroxyl groups or water molecules formed from such hydroxyl groups separate back, and hence, a disorder or discordance may occur in the surface structure of the crystals to inhibit the growth of the grains.

When calcination is conducted by adding the conductive carbon precursor to the raw materials before their calcination [in the process in which calcination is conducted in two stages to the raw materials before calcination in the first stage or raw material after the calcination in the first stage (intermediate)], addition of hydrogen (including that produced from the reaction of the water with the conductive carbon precursor such as coal pitch or a saccharide) is found to allow carbon to deposit evenly on the resulting cathode material and to obtain still higher cathode performance such as a significant increase in discharge capacity. This mechanism has also not been elucidated yet, but the addition of hydrogen to the conductive carbon precursor in its molten state is presumed to be effective in lowering its viscosity and allowing the conductive carbon to deposit evenly on the grains of the cathode material. This effect pronouncedly appears especially when the conductive carbon precursor added to the raw materials is a polysaccharide, such as dextrin, which has high viscosity in a molten state compared to coal pitch or the like the viscosity of which is relatively low in a molten state. Moreover, hydrogen (including that produced from the reaction of the water with the conductive carbon precursor such as coal pitch or a saccharide) acts especially advantageously when the amount of the conductive carbon precursor is limited to a relatively low level to restrict the amount of carbon to be deposited (for example, when the concentration by weight of carbon is less than about 2% in the cathode active material).

Generally, the deposition of carbon on the surface of cathode active material has a significant effect for an improvement in surface conductivity, but on the other hand, involves a problem that it inhibits movements of alkali metal ions such as $Li^+$ ions at the boundary between the cathode active material and the electrolyte in the electrode redox reaction. In this respect, the addition of hydrogen assures to provide the resulting cathode with still higher performance and is very advantageous because, when the above-mentioned effect is obtained as a result of the addition of hydrogen, the amount of the conductive carbon precursor to be added can be reduced to also prevent the inhibition of movements of alkali metal ions while enabling uniform deposition of conductive carbon.

The present invention will next be described in more detail with reference to Examples and the like, but the present invention shall not be limited by these Examples.

EXAMPLE 1

(1) Production of Cathode Material

A cathode material, $LiFePO_4$, was synthesized by the following procedure.

$FeC_2O_4 \cdot 2H_2O$ (5.0532 g; product of Wako Pure Chemical Industries, Ltd.), $(NH_4)_2HPO_4$ (3.7094 g; product of Wako Pure Chemical Industries, Ltd.), $LiOH \cdot H_2O$ (1.1784 g; product of Wako Pure Chemical Industries, Ltd.), and reagent-grade dextrin (0.5500 g; product of Wako Pure Chemical Industries, Ltd.) were separately pulverized in agate mortars and then mixed together. The mixture was placed in an alumina crucible and at first, was subjected to pre-calcination at 350° C. for 5 hours while feeding a mixed gas of 5% by volume of hydrogen ($H_2$) and 95% by volume of argon (Ar) at a flow rate of 200 ml/minute. The thus-obtained pre-calcined mixture was taken out and pulverized in an agate mortar, and was further calcined at 675° C. for 24 hours in the same atmosphere (the feeding of the mixed gas was continued from before the start of heating, during the calcination and even after the mixture was allowed to cool down). The thus-synthesized cathode material was identified by powder X-ray diffraction to be $LiFePO_4$ having the olivine-type crystal structure, and diffraction peaks ascribable to oxidized-form impurities such as $\alpha\text{-}Fe_2O_3$ and other impurities were not observed at all.

From the results of an analysis of the cathode material by powder X-ray diffraction, its crystallite size was determined in accordance with the Scherrer's formula while using silicon powder of a known particle size as a reference. Further, its primary grain size was also determined by an observation with a scanning electronic microscope. These crystallite size and primary grain size will be shown below in Table 1. The results of an elemental analysis indicated that the carbon content in that product was 4.02% by weight, and the remaining ratio of carbon through the pyrolysis into the carbon from the original dextrin was calculated to be about 31% by weight.

(2) Fabrication of a Secondary Battery

That cathode material, acetylene black as a conductivity-imparting material [ "Denka Black" (registered trademark), product of Denki Kagaku Kogyo K.K.; 50% pressed product] and unsintered PTFE (polytetrafluoroethylene) powder as a binder were mixed and kneaded to give a weight ratio of 70.6/24.4/5, the resulting mass was rolled into a sheet of 0.7 mm in thickness, and the sheet was punched out into discs of 1.0 cm in diameter to provide pellets as cathodes.

A metal titanium screen and a metal nickel screen were then welded as cathode and anode current collectors, respectively, to a coin-type battery case made of stainless steel (Model No. CR2032) by spot welding. The cathode and an anode made of a metal lithium foil were assembled in the battery case with a porous polyethylene separator interposed between the cathode and the anode. The battery case was filled with a 1 M solution of $LiPF_6$ in a 1:1 mixed solvent of dimethyl carbonate and ethylene carbonate as an electrolyte solution, and then sealed to fabricate a coin-type lithium secondary battery. The series of assembling, filling and sealing operations of the cathode, anode, separator, electrolyte solution and the like were performed in an argon-purged glove box.

The secondary battery with the cathode material produced by the production process according to the present invention and incorporated therein as described above was repeatedly charged and discharged at current densities of 0.5 mA/cm$^2$ and 1.6 mA/cm$^2$ of apparent area of the cathode pellet, respectively, in an operating voltage range of from 3.0 V to 4.0 V. The average initial discharge capacities in the $1^{st}$ to $20^{th}$ cycles were as shown in Table 1 (the initial discharge capacities were standardized based on the weight of the cathode active material in the product).

Figure 2:
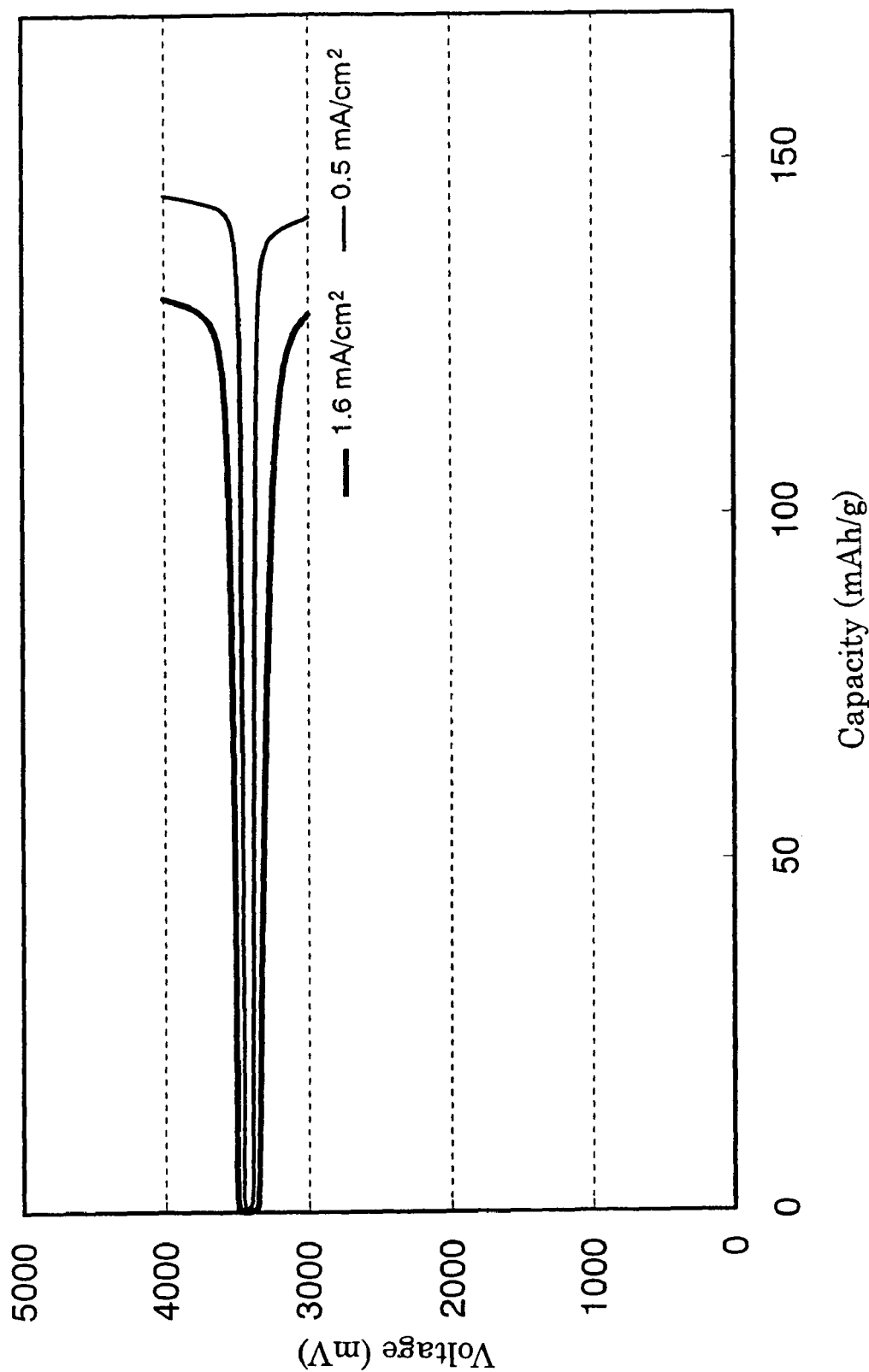
FIG. 2 is a graphic diagram showing the charge/discharge characteristics of a coin-type secondary battery obtained in Example 1.

The charge/discharge characteristics of the coin-type lithium secondary battery in the $10^{th}$ cycle under the above-described conditions are shown in FIG. 2.

COMPARATIVE EXAMPLE 1

Olivine-type $LiFePO_4$ was obtained as a cathode material by a similar synthesis process as in Example 1 except that the feed gas employed upon calcination was changed to 100 volume % argon gas free of hydrogen and the reagent-grade dextrin was not added to the raw materials [This process basically follows the process described in the $40^{th}$ Battery Symposium in Japan, Report 3C14 (Preprint, p.349, 1999)]. The results of its analysis by powder X-ray diffraction and its primary grain size as determined by an observation with a scanning electron microscope are shown in Table 1. Further, a coin-type lithium secondary battery of a similar construction as in Example 1 was fabricated, and a charging/discharging cycle test was conducted in a similar manner as in Example 1. The average initial discharge capacities in the $1^{st}$ to $20^{th}$ cycles are also shown in Table 1. The charge/discharge characteristics of that coin-type lithium secondary battery in the $10^{th}$ cycle under the above-described conditions are shown in FIG. 3.

Comparing Example 1 with Comparative Example 1, it has been confirmed from the results of the X-ray diffraction analyses that the products of Example 1 and Comparative Example 1 were both olivine-type $LiFePO_4$ substantially in their entireties, although the crystallite size of the product of Comparative Example 1 was about 1.6 times larger than that of the product of Example 1. On the other hand, it is also understood that concerning the primary grain sizes of the products as determined by the observations with the scanning electron microscope, the product of Comparative Example 1 was larger than that of Example 1 as in the case of their crystallite sizes. Further, the initial discharge capacities were smaller in Comparative Example 1 than in Example 1. The intra-cell resistance observed upon charging/discharging was clearly larger in Comparative Example 1 than in Example 1.

Figure 3:
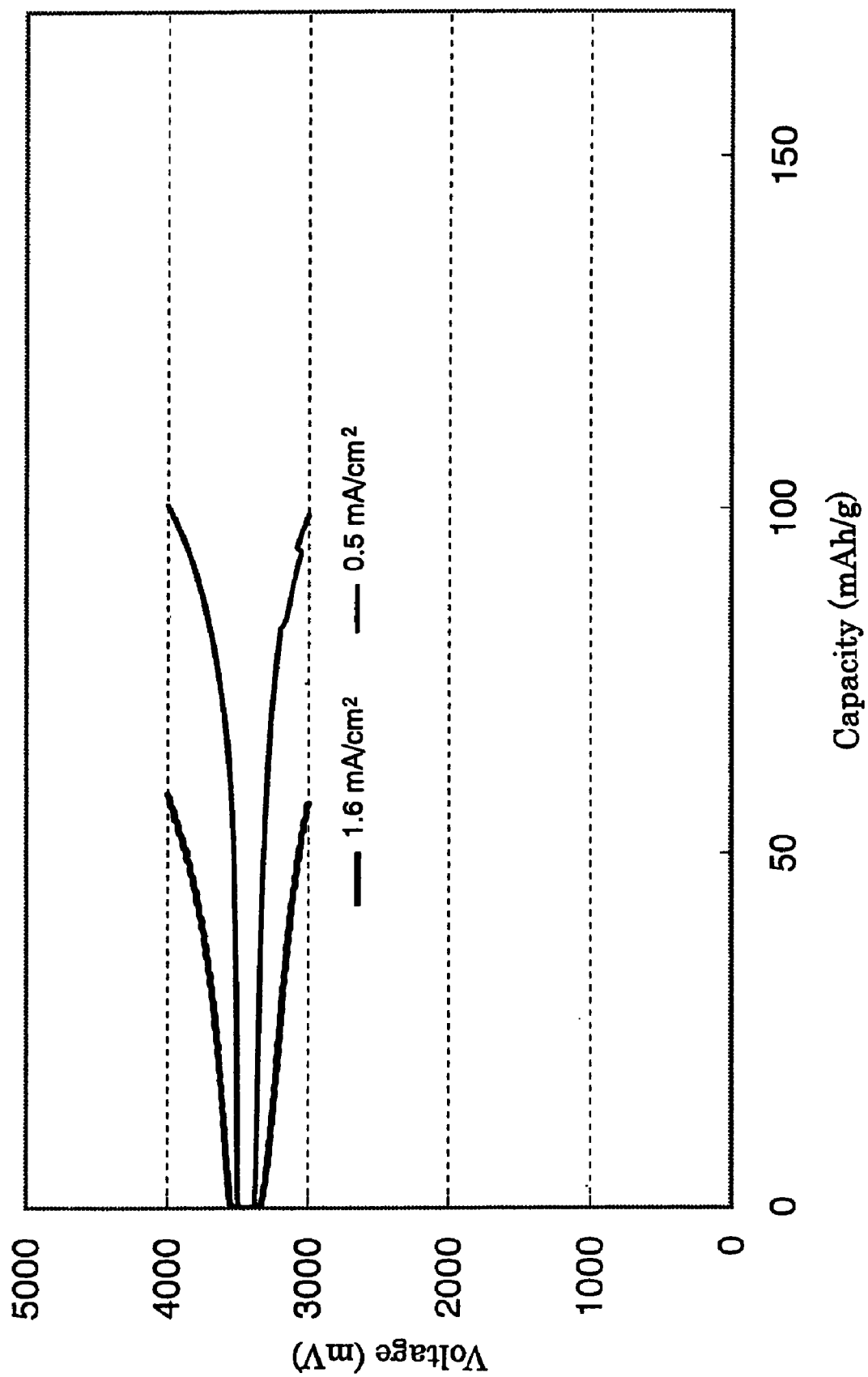
FIG. 3 is a graphic diagram showing the charge/discharge characteristics of a coin-type secondary battery obtained in Comparative Example 1.

Comparing FIG. 2 with FIG. 3, the product of Example 1 in which calcination was carried out in the presence of hydrogen with the addition of dextrin had flat voltage regions of charge and discharge voltages up to a value closer to the theoretical capacity (170 mAh/g) than that of Comparative Example 1 in which calcination was carried out without feeding hydrogen and without adding dextrin. A marked difference is therefore observed in charge/discharge characteristics between them. Further, the difference between the charge voltage and the discharge voltage was small in Example 1, thereby indicating that the secondary battery of Example 1 had a smaller intra-cell resistance and a higher voltage efficiency. It is, therefore, understood that the secondary battery of Example 1 was excellent in charge/discharge characteristics.

From the results described above, it is indicated that calcination of raw materials together with dextrin and hydrogen, a reductive crystal-growth inhibitor, added thereto as in Example 1 can prevent the primary grain size of crystals of $LiFePO_4$, a cathode material, from becoming greater and at the same time, allows conductive carbon to deposit evenly, and therefore, that a secondary battery making use of the cathode material is provided with an increased initial discharge capacity and also with improved battery performance. Especially in Example 1, it is worthy to note that a discharge capacity as large as 125 mAh/g was achieve even at the current density as high as 1.6 mA/cm$^2$. This suggests that the cathode material is also applicable to power sources required to generate large currents, for example, for driving vehicles such as hybrid electric vehicles and for operating mobile telephones.

EXAMPLE 2

As a cathode material containing conductive carbon derived from acetylene black, olivine-type $LiFePO_4$ was obtained by a similar synthesis process as in Comparative Example 1 except that the feed gas employed upon calcination was changed to a mixed gas of 5 volume % hydrogen/95 volume % argon gas and acetylene black [0.1000 g; prepared by pulverizing "Denka Black" (registered trademark, product of Denki Kagaku Kogyo K.K.; 50% pressed product) for 1 hour in an automated agate mortar] was added to and mixed with the raw materials in advance. The results of its analysis by powder X-ray diffraction and its primary grain size as determined by an observation with a scanning electron microscope are shown in Table 1. Further, a coin-type lithium secondary battery of a similar construction as in Example 1 was fabricated, and a charging/discharging cycle test was conducted in a similar manner as in Example 1. The average initial discharge capacities in the $1^{st}$ to $20^{th}$ cycles are also shown in Table 1.

From the results of the X-ray diffraction analysis, it has been confirmed that the product of Example 2 was olivine-type $LiFePO_4$ substantially in its entirety, although the crystallite size of the product of Comparative Example 1 was about 20 to 30% larger than that of the product of Example 2. On the other hand, it is also understood that concerning the primary grain sizes of the products as determined by the observations with the scanning electron microscope, the product of Comparative Example 1 was larger than that of Example 2 as in the case of their crystallite sizes.

As also shown in Table 1, it is appreciated that concerning the initial discharge capacities, the secondary battery of Example 2 was substantially improved over that of Comparative Example 1 although it had smaller values than that of Example 1. With respect to the intra-cell resistance upon charging and discharging, the secondary battery of Comparative Example 1 was apparently higher than that of Example 2.

From the results described above, it is indicated that calcination of raw materials together with acetylene black as a conductive carbon source and hydrogen, which has reductive crystal-growth inhibiting effect, added thereto as in Example 2 can prevent the primary grain size of crystals of $LiFePO_4$, a cathode material, from becoming greater and can also provide grains of the cathode material with improved surface conductivity, and therefore, that a secondary battery making use of the cathode material is provided with an increased initial discharge capacity and also with improved battery performance.

EXAMPLE 3

As a cathode material containing conductive carbon derived from acetylene black, olivine-type $LiFePO_4$ was obtained by a similar synthesis process as in Comparative Example 1 except that the feed gas employed upon calcination was changed to a mixed gas of 8 volume % water (pre-vaporized water vapor)/92 volume % argon gas and acetylene black [0.1000 g; prepared by pulverizing "Denka Black" (registered trademark, product of Denki Kagaku Kogyo K.K., 50% pressed product) for 1 hour in an automated agate mortar] was added to and mixed with the raw materials in advance. The results of its analysis by powder X-ray diffraction and its primary grain size as determined by an observation with a scanning electron microscope are shown in Table 1. Further, a coin-type lithium secondary battery of a similar construction as in Example 1 was fabricated, and a charging/discharging cycle test was conducted in a similar manner as in Example 1. The average initial discharge capacities in the $1^{st}$ to $20^{th}$ cycles are also shown in Table 1.

From the results of the X-ray diffraction analysis, it has been confirmed that the product of Example 3 was olivine-type $LiFePO_4$ in its entirety, although the crystallite size of the product of Comparative Example 1 was about 20 to 30% larger than that of the product of Example 3. On the other hand, it is also understood that concerning the primary grain sizes of the products as determined by the observations with the scanning electron microscope, the product of Comparative Example 1 was larger than that of Example 3 as in the case of their crystallite sizes.

As also shown in Table 1, it is appreciated that concerning the initial discharge capacities, the secondary battery of Example 3 was substantially improved over that of Comparative Example 1 although it had smaller values than that of Example 1. With respect to the intra-cell resistance upon charging and discharging, the secondary battery of Comparative Example was apparently higher than that of Example 3.

From the results described above, it is indicated that calcination of raw materials together with acetylene black and water (water vapor) added thereto as a conductive carbon source and a crystal growth inhibitor, respectively, as in Example 3 can prevent the primary grain size of crystals of $LiFePO_4$, a cathode material, from becoming greater and can also provide grains of the cathode material with improved surface conductivity, and therefore, that a secondary battery making use of the cathode material is provided with an increased initial discharge capacity and also with improved battery performance.

TABLE 1

| Calcination for 24 h at 675° C. | Results of X-ray Diffraction analysis Crystallite size (nm) | Primary grain size observed with scanning electron microscope (μm) | Initial discharge capacity (mAh/g) |
|---|---|---|---|
| Example 1 (Calcined with added dextrin in 5% $H_2$) | 77 | Approx. 0.1 to 0.4 | 147 (0.5 mA/cm$^2$) 125 (1.6 mA/cm$^2$) |
| Example 2 (Calcined with added acetylene black in 5% $H_2$) | 101 | Approx. 0.2 to 0.7 | 139 (0.5 mA/cm$^2$) 102 (1.6 mA/cm$^2$) |
| Example 3 (Calcined with added acetylene black in 8% $H_2O$) | 98 | Approx. 0.2 to 0.7 | 139 (0.5 mA/cm$^2$) 99 (1.6 mA/cm$^2$) |
| Comparative Example 1 (Calcined in 100% Ar gas) | 126 | Approx. 0.3 to 1.0 or greater | 102 (0.5 mA/cm$^2$) 59 (1.6 mA/cm$^2$) |

EXAMPLE 4

To the same cathode material as that used in Example 1, the same acetylene black and PVDF (polyvinylidene fluoride) were added to give a weight ratio of 80/15/5. To the resultant mixture, 50% by weight of N-methylpyrrolidone was added, followed by kneading. The thus-obtained mass was coated on an aluminum foil to give a thickness of 0.15 mm and dried to obtain a cathode sheet. On the other hand, natural graphite was used as an anode material, to which PVDF (polyvinylidene fluoride) was added such that the weight ratio of graphite to PVDF became 90/10. To the resultant mixture, N-methylpyrrolidone was added as much as the weight of the mixture, and the thus-obtained mixture was kneaded, coated on a copper foil to give a thickness of 0.15 mm, and then dried to obtain an anode sheet. Those sheets were punched out to form discs each having a diameter of 1.0 cm. The discs were assembled in a threaded cell made of stainless steel with the same porous polyethylene separator as in Example 1 being interposed between the discs and also, with the same electrolyte solution being filled therein to form a lithium ion battery. The battery was repeatedly charged and discharged at a current density of 0.5 mA/cm$^2$ of apparent area in an operating voltage range of from 2.8 V to 4.0 V. The average initial discharge capacity in the 1$^{st}$ to 20$^{th}$ cycles was as shown in Table 2.

COMPARATIVE EXAMPLE 2

A lithium ion battery was fabricated with the same construction as in Example 4 except that the same cathode material as that used in Comparative Example 1 was adopted. The battery was repeatedly charged and discharged at a current density of 0.5 mA/cm$^2$ of apparent area in an operating voltage range of from 2.8 V to 4.0 V. The average initial discharge capacity in the 1$^{st}$ to 20$^{th}$ cycles was as shown in Table 2. Compared with the battery of Comparative Example 2 making use of the cathode material produced by adding neither hydrogen nor dextrin, the battery of Example 4 making use of the cathode material produced by adding hydrogen and dextrin showed a greater discharge capacity, thereby demonstrating higher performance.

TABLE 2

|  | Initial discharge capacity (mAh/g) (0.5 mA/cm$^2$) |
| --- | --- |
| Example 4 | 145 |
| Comparative Example 2 | 97 |

EXAMPLE 5

(1) Production of Cathode Material:

A cathode material, LiFePO$_4$, was synthesized by the following procedure.

To a mixture of Fe$_3$(PO$_4$)$_2$.8H$_2$O (5.0161 g; product of Soegawa Chemical Co., Ltd.), Li$_3$PO$_4$ (1.1579 g; product of Wako Pure Chemical Industries, Ltd.), and refined coal pitch (0.1160 g; softening point: 200° C.; "MCP-200", product of Adchemco Corp.), ethanol was added about 1.5 times in volume as much as the mixture. The thus-obtained mixture was pulverized and mixed in a planetary ball mill equipped with zirconia pots and zirconia beads of 2 mm in diameter, and then dried at 50° C. under reduced pressure.

After the drying, the pulverized mixture was placed in an alumina crucible and at first, was subjected to pre-calcination at 400° C. for 5 hours while feeding a mixed gas of 5% by volume of H$_2$ and 95% by volume of Ar at a flow rate of 200 ml/minute. The thus-obtained pre-calcined mixture was taken out and pulverized in an agate mortar, and was further calcined at 675° C. for 10 hours in the same atmosphere (the feeding of the gas was continued from before the start of heating until after the mixture was allowed to cool down). The thus-synthesized cathode material was identified by powder X-ray diffraction to be LiFePO$_4$ having the olivine-type crystal structure, and crystal diffraction peaks ascribable to oxidized-form impurities such as α-Fe$_2$O$_3$ and FePO$_4$ and other impurities were not observed.

It was determined by an elemental analysis that carbon formed by pyrolysis of the refined coal pitch was contained as much as 1.61% by weight. Nonetheless, no diffraction peak ascribable to graphite crystals was observed by powder X-ray diffraction and therefore, the cathode material was gathered to be in the form of a composite material with amorphous carbon.

The crystallite size of the cathode material as determined from the results of its powder X-ray diffraction analysis will be shown below in Table 3.

(2) Fabrication of a Secondary Battery

That cathode material, acetylene black as a conductivity-imparting material ["Denka Black" (registered trademark), product of Denki Kagaku Kogyo K.K.; 50% pressed product] and unsintered PTFE (polytetrafluoroethylene) powder as a binder were mixed and kneaded to give a weight ratio of 70.3/24.7/5, the resulting mass was rolled into a sheet of 0.7 mm in thickness, and the sheet was punched out into discs of 1.0 cm in diameter to provide pellets as cathodes.

Subsequently, a coin-type lithium secondary battery was fabricated under similar conditions as in Example 1. The series of assembling, filling and sealing operations of the cathode, anode, separator, electrolyte solution and the like were performed in an argon-purged glove box.

Figure 4:
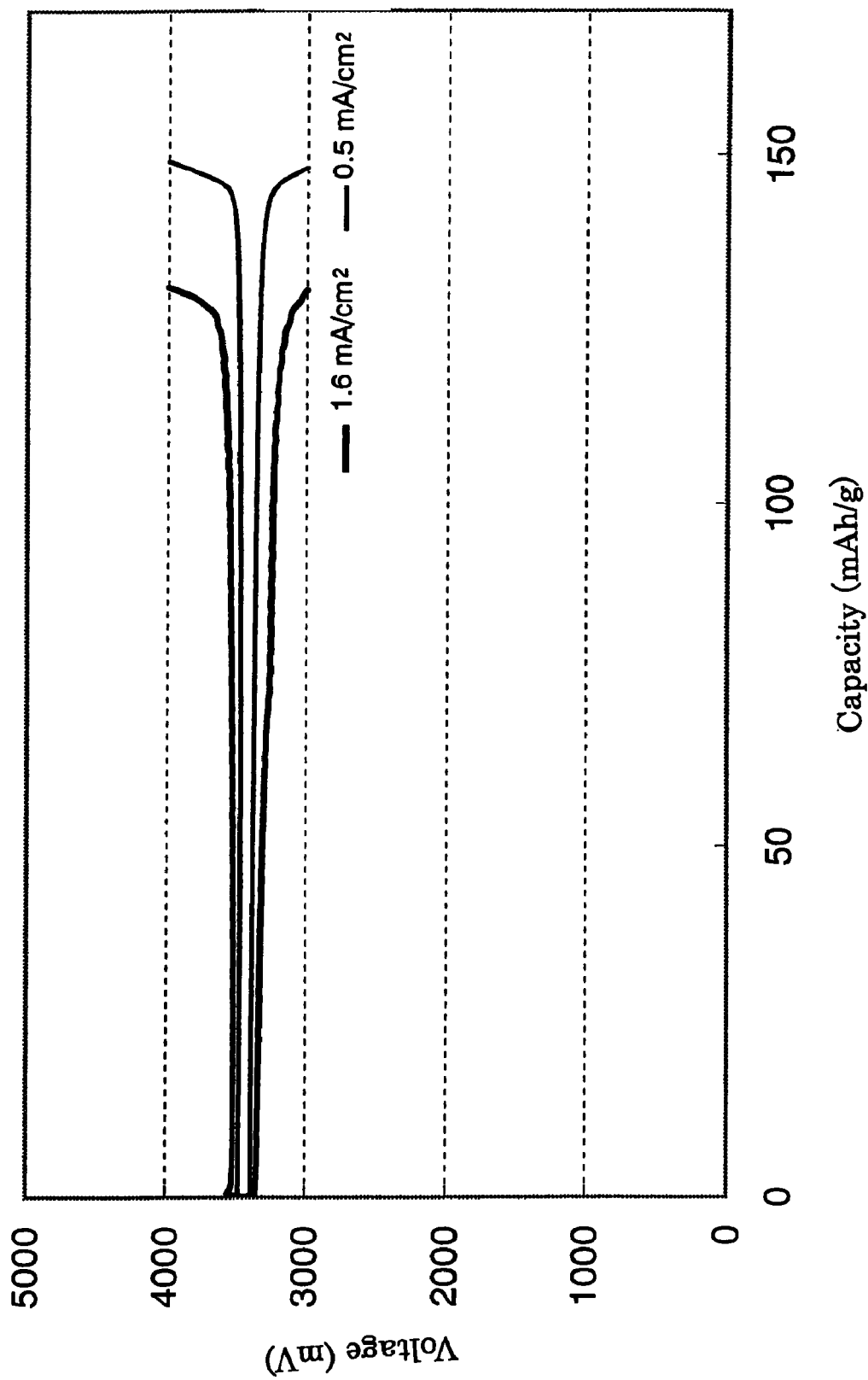
FIG. 4 is a graphic diagram showing the charge/discharge characteristics of a coin-type secondary battery obtained in Example 5.

The secondary battery with the cathode material produced by the production process according to the present invention and incorporated therein as described above was repeatedly charged and discharged at current densities of 0.5 mA/cm$^2$ and 1.6 mA/cm$^2$ of apparent area of the cathode pellet, respectively, in an operating voltage range of from 3.0 V to 4.0 V. The average initial discharge capacities in the 1$^{st}$ to 20$^{th}$ cycles were as will shown below in Table 3. Further, the charge/discharge characteristics of the coin-type lithium secondary battery in the 10$^{th}$ cycle under the above-described conditions are shown in FIG. 4.

COMPARATIVE EXAMPLE 3

Figure 5:
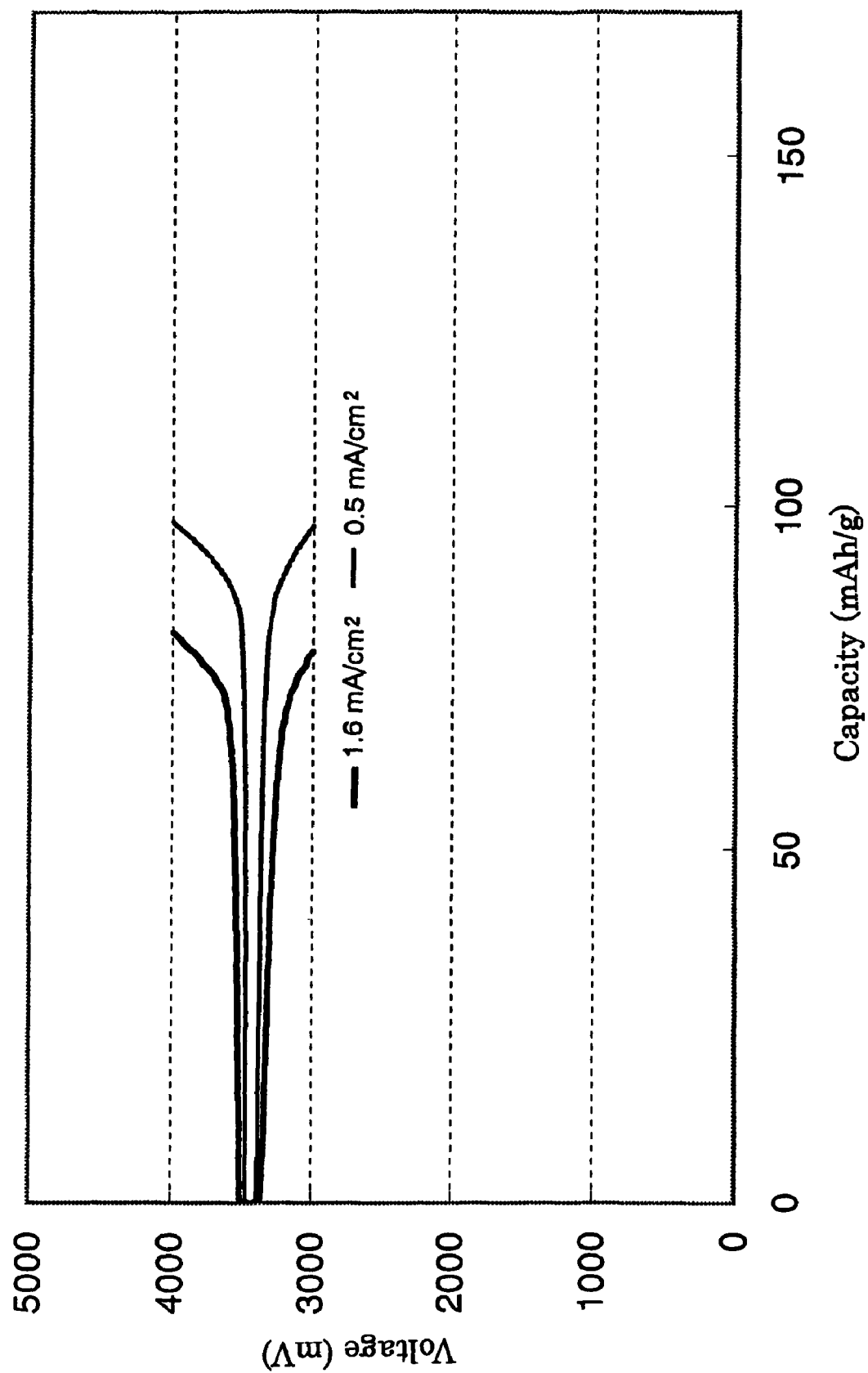
FIG. 5 is a graphic diagram showing the charge/discharge characteristics of a coin-type secondary battery obtained in Comparative Example 3.

Olivine-type LiFePO$_4$ was obtained as a cathode material by a similar synthesis process as in Example 5 except that the feed gas employed upon calcination was changed to 100 volume % argon gas free of hydrogen. The crystallite size of the cathode material as determined from the results of its analysis by powder X-ray diffraction will be shown below in Table 3. Further, a coin-type lithium secondary battery of a similar construction as in Example 5 was fabricated, and a charging/discharging cycle test was conducted in a similar manner as in Example 5. The average initial discharge capacities in the 1$^{st}$ to 20$^{th}$ cycles are also shown in Table 3. The charge/discharge characteristics of that coin-type lithium secondary battery in the 10$^{th}$ cycle under the above-described conditions are shown in FIG. 5.

TABLE 3

|  | Results of X-ray Diffraction Analysis Crystallite size (nm) | Initial discharge capacity (mAh/g) (0.5 mA/cm$^2$) | Initial discharge capacity (mAh/g) (1.6 mA/cm$^2$) |
| --- | --- | --- | --- |
| Example 5 (Refined coal pitch of 200° C. softening point added; calcined in 5% H$_2$) | 153 | 142 | 130 |
| Comparative Example 3 (Refined coal pitch of 200° C. softening point added; calcined in 100% Ar) | 172 | 98 | 81 |

From Table 3, it is understood that, by conducting calcination with hydrogen added as described in Example 5, a secondary battery making use of the cathode material $LiFePO_4$ is provided with an increased initial discharge capacity to exhibit higher performance. A comparison between Example 5 and Comparative Example 3 indicates that the crystal-growth inhibiting effect of hydrogen is limited at such a level as not allowing to consider to be very pronounced although the crystallite size was certainly decreased by the addition of hydrogen. However, the increase in discharge capacity was extremely pronounced as also seen in Table 3.

Comparing FIG. 4 with FIG. 5, the product of Example 5 in which the raw materials were calcined with the addition of the coal pitch in the presence of hydrogen had flat voltage regions of charge and discharge voltages up to a value closer to the theoretical capacity (170 mAh/g) than that of Comparative Example 3 in which calcination was carried out with the addition of the coal pitch but without feeding hydrogen, and further, the difference between the charge voltage and the discharge voltage was sufficiently small in Example 5. It is, therefore, understood that the secondary battery of Example 5 was excellent in charge/discharge characteristics.

The pronouncedly improved charge/discharge characteristics in Example 5 as compared with those in Comparative Example 3 may presumably be attributed to the reasons to be described next. The addition of hydrogen to the molten coal pitch during calcination probably lowered its viscosity and therefore, facilitated the molten coal pitch to spread over the surfaces of grains of the cathode active material, lithium ion phosphate, formed by the calcination so that more even deposition of pyrolytic carbon occurred. This effect appears especially pronouncedly when the conductive carbon precursor added to the raw materials is dextrin or a like polysaccharide the viscosity of which becomes high when caused to melt as compared with the case that the conductive carbon precursor added to the raw materials is coal pitch or the like the viscosity of which becomes relatively low when caused to melt. Similarly, this effect appears especially pronouncedly when as in Example 5, the amount of a conductive carbon precursor such as coal pitch or dextrin to be added is controlled to a relatively small level to allow the deposition of carbon in a limited amount (for example, the concentration by weight of carbon deposited in the cathode material may be limited to less than 2%).

Generally, deposition of carbon on the surface of a cathode active material is very effective for improving its surface conductivity, but conversely, involves the problem that it inhibits movements of $Li^+$ ions through the interface between the cathode active material and the electrolyte solution in the electrode redox reaction. Because of the above-mentioned effect available from the addition of hydrogen, it is possible to reduce the amount of the substance to be added, said substance being capable of depositing conductive carbon by pyrolysis such as coal pitch or dextrin, and as a result, the inhibition of movements of $Li^+$ ions can be avoided. The addition of hydrogen is hence very advantageous.

EXAMPLE 6

(1) Production of Cathode Material:

A cathode material, $LiFePO_4$, was synthesized by the following procedure.

To a mixture of $FeC_2O_4 \cdot 2H_2O$ (5.0532 g; product of Wako Pure Chemical Industries, Ltd.), $(NH_4)_2HPO_4$ (3.7094 g; product of Wako Pure Chemical Industries, Ltd.) and $LiOH \cdot H_2O$ (1.1784 g; product of Wako Pure Chemical Industries, Ltd.), ethanol was added about 1.5 times in volume as much as the mixture. The thus-obtained mixture was pulverized and mixed in a planetary ball mill equipped with zirconia pots and zirconia beads of 2 mm in diameter, and then dried at 50° C. under reduced pressure. After the drying, the pulverized mixture was placed in an alumina crucible and at first, was subjected to pre-calcination at 400° C. for 5 hours while feeding a mixed gas of 5% by volume of hydrogen ($H_2$) and 95% by volume of argon (Ar) at a flow rate of 200 ml/minute. The pre-calcined raw materials (2.1364 g) were taken out, to which refined coal pitch [0.1097 g; softening point: 200° C.; "MCP-200" (trade name), product of Adchemco Corp.] was added. The resulting mixture was pulverized in an agate mortar, and was further subjected to main calcination at 775° C. for 10 hours in the same atmosphere (the feeding of the mixed gas was continued from before the start of heating, during the calcination, and further, until after the mixture was allowed to cool down). The thus-synthesized cathode material was identified by powder X-ray diffraction to be $LiFePO_4$ having the olivine-type crystal structure. On the other hand, crystal diffraction peaks ascribable to oxidized-form impurities such as $\alpha\text{-}Fe_2O_3$ and $FePO_4$ and other impurities were not observed.

It was determined by an elemental analysis that carbon formed by pyrolysis of the refined coal pitch was contained as much as 3.08% by weight. Nonetheless, no diffraction peak ascribable to graphite crystals was observed by powder X-ray diffraction and therefore, the cathode material was gathered to be in the form of a composite material with amorphous carbon. Further, the crystallite size was 64 nm.

(2) Fabrication of a Secondary Battery

That cathode material, acetylene black as a conductivity-imparting material ["Denka Black" (registered trademark), product of Denki Kagaku Kogyo K.K.; 50% pressed product] and unsintered PTFE (polytetrafluoroethylene) powder as a binder were mixed and kneaded to give a weight ratio of 70.6/24.4/5, the resulting mass was rolled into a sheet of 0.7 mm in thickness, and the sheet was punched out into discs of 1.0 cm in diameter to provide pellets as cathodes.

A metal titanium screen and a metal nickel screen were then welded as cathode and anode current collectors, respectively, to a coin-type battery case made of stainless steel (Model No. CR2032) by spot welding. The cathode and an anode made of a metal lithium foil were assembled in the battery case with a porous polyethylene separator interposed between the cathode and the anode. The battery case was filled with a 1 M solution of $LiPF_6$ in a 1:1 mixed solvent of dimethyl carbonate and ethylene carbonate as an electrolyte solution, and then sealed to fabricate a coin-type lithium secondary battery. The series of assembling, filling and sealing operations of the cathode, anode, separator, electrolyte solution and the like were performed in an argon-purged glove box.

The secondary battery with the cathode material produced as described above and incorporated therein as described above was repeatedly charged and discharged at current densities of 0.5 mA/cm$^2$ and 1.6 mA/cm$^2$ of apparent area of the cathode pellet, respectively, in an operating voltage range of from 3.0 V to 4.0 V. The average initial discharge capacities in the $1^{st}$ to $20^{th}$ cycles were as shown in Table 4 (the initial discharge capacities were standardized based on the weight of the cathode active material in the product).

EXAMPLE 7

Olivine-type $LiFePO_4$ was obtained as a cathode material by a similar synthesis process as in Example 6 except that the pre-calcination and main calcination were conducted by adding the refined coal pitch, the softening point of which was 200° C., to the raw materials before the pre-calcination.

Specifically, the refined coal pitch (0.1940 g), the softening point of which was 200° C., was added to a mixture of $FeC_2O_4 \cdot 2H_2O$, $(NH_4)_2HPO_4$ and $LiOH \cdot H_2O$ the amounts of which were the same as in Example 6. By using the planetary ball mill, the thus-obtained mixture was pulverized and mixed. After drying, the pulverized mixture was subjected to pre-calcination in an alumina crucible at 400° C. for 5 hours in the same atmosphere and subsequent to pulverization, further to main calcination at 775° C. for 10 hours in the same atmosphere. No substantial difference was observed in X-ray diffraction between the thus-obtained cathode material and that obtained in Example 6, and the crystallite size was 64 nm, which was not different from that in Example 6. It has also been found from an elemental analysis that carbon formed by pyrolysis of the refined coal pitch was contained as much as 3.04% by weight and that the amount of deposited carbon was not substantially different from that in Example 6.

Using the cathode material, a coin-type lithium secondary battery of a similar construction as in Example 6 was fabricated, and a charging/discharging cycle test was conducted in a similar manner as in Example 6. The average initial discharge capacities in the $1^{st}$ to $20^{th}$ cycles are also shown in Table 4.

As shown in Table 4, the initial discharge capacities in Example 7 were relatively good, and therefore, the effects brought about owing to the addition of hydrogen and refined coal pitch can be recognized, but it is understood that the initial discharge capacities increased further in Example 6.

From the foregoing description, it is understood that, by conducting main calcination of raw materials together with coal pitch, the softening point of which is 200° C., added to the raw materials subsequent to pre-calcination upon subjecting the raw materials to the pre-calcination and main calcination while adding hydrogen as described in Example 6, a secondary battery making use of the cathode material $LiFePO_4$ is provided with a further increased initial discharge capacity and higher performance. The content of deposited carbon in the cathode material of Example 7 was substantially the same as that of Example 6, and in addition, there was no difference in crystallite size between those two cathode materials. These results indicate that the deposition of carbon, which was formed from the coal pitch during calcination, onto the surfaces of cathode material grains occurred in a better state in Example 6 than in Example 7, and that as a result, the higher cathode performance was realized. Presumably, this is attributed to the following reasons.

Firstly, the refined coal pitch having the softening point of 200° C. melted well during the heating in the main calcination, and on the other hand, most of the gas formed by the decomposition of the raw materials was released in the course of the pre-calcination. During the main calcination, gas was hence given off only in a small amount from the raw materials, so that the melt of the refined coal pitch did not foam. Secondary, the added hydrogen lowered, the viscosity of the melt of the coal pitch so that the coal pitch more evenly spread over the surfaces of the resulting cathode material grains, and as the pyrolysis was carried out in that state, the conductive carbon deposited very evenly. The extremely high cathode performance is considered to have been brought about for the reasons described above.

EXAMPLE 8

A cathode material, $LiFePO_4$, was synthesized by the following procedure.

To a mixture of $Fe_3(PO_4)_2 \cdot 8H_2O$ (5.0161 g; product of Soegawa Chemical Co., Ltd.) and $Li_3PO_4$ (1.1579 g; product of Wako Pure Chemical Industries, Ltd.), ethanol was added about 1.5 times in volume as much as the mixture. The thus-obtained mixture was pulverized and mixed in a planetary ball mill equipped with zirconia pots and zirconia beads of 2 mm in diameter, and then dried at 50° C. under reduced pressure. After the drying, the pulverized mixture was placed in an alumina crucible and at first, was subjected to pre-calcination at 400° C. for 5 hours while feeding a mixed gas of 5% by volume of hydrogen ($H_2$) and 95% by volume of argon (Ar) at a flow rate of 200 ml/minute. The pre-calcined raw materials (4.0712 g) were taken out, to which refined coal pitch [0.1879 g; softening point: 200° C.; "MCP-200" (trade name), product of Adchemco Corp.] was added. The resulting mixture was pulverized in an agate mortar, and was further subjected to main calcination at 725° C. for 10 hours in the same atmosphere (the feeding of the mixed gas was continued from before the start of heating, during the calcination, and further, until after the mixture was allowed to cool down). The thus-synthesized cathode material was identified by powder X-ray diffraction to be $LiFePO_4$ having the olivine-type crystal structure. On the other hand, crystal diffraction peaks ascribable to oxidized-form impurities such as $\alpha$-$Fe_2O_3$ and $FePO_4$ and other impurities were not observed.

It was determined by an elemental analysis that carbon formed by pyrolysis of the refined coal pitch was contained as much as 2.98% by weight. Nonetheless, no diffraction peak ascribable to graphite crystals was observed by X-ray diffraction and therefore, the cathode material was gathered to be in the form of a composite material with amorphous carbon. Further, the crystallite size was 167 nm.

Using that cathode material, a cathode pellet and a coin-type lithium secondary battery were produced under similar conditions as in Example 6.

The secondary battery with the cathode material obtained and incorporated therein as described above was repeatedly charged and discharged at current densities of 0.5 mA/cm$^2$ and 1.6 mA/cm$^2$ of apparent area of the cathode pellet, respectively, in an operating voltage range of from 3.0 V to 4.0 V. The average initial discharge capacities in the $1^{st}$ to $20^{th}$ cycles were as shown in Table 4 (the initial discharge capacities were standardized based on the weight of the cathode active material in the product).

EXAMPLE 9

Olivine-type $LiFePO_4$ was obtained as a cathode material by a similar synthesis process as in Example 8 except that the pre-calcination and main calcination were conducted by adding the refined coal pitch, the softening point of which was 200° C., to the raw materials before the pre-calcination.

Specifically, the refined coal pitch (0.1940 g), the softening point of which was 200° C., was added to a mixture of $Fe_3(PO_4)_2 \cdot 8H_2O$ (product of Soegawa Chemical Co., Ltd.) and $Li_3PO_4$ (product of Wako Pure Chemical Industries, Ltd.) the amounts of which were the same as in Example 8. By using the planetary ball mill, the thus-obtained mixture was pulverized and mixed. After drying, the pulverized mixture was subjected to pre-calcination in an alumina crucible at 400° C. for 5 hours in the same atmosphere and subsequent to pulverization, further to main calcination at 725° C. for 10 hours in the same atmosphere. No substantial difference was observed in X-ray diffraction between the thus-obtained cathode material and that obtained in Example 8, and the crystallite size was 162 nm, which was not substantially different from that in Example 8. It has also been found from an elemental analysis that carbon formed by pyrolysis of the refined coal pitch was contained as much as 3.13% by weight and that the amount of deposited carbon was not substantially different from that in Example 8.

Using the cathode material, a coin-type lithium secondary battery of a similar construction as in Example 8 was fabricated, and a charging/discharging cycle test was conducted in a similar manner as in Example 8. The average initial discharge capacities in the $1^{st}$ to $20^{th}$ cycles are also shown in Table 4.

As shown in Table 4, the initial discharge capacities in Example 9 were relatively good, and therefore, the effects brought about owing to the addition of hydrogen and refined coal pitch can be recognized, but it is understood that the initial discharge capacities increased further in Example 8. Similar reasons are considered to be applicable to these outcomes as in Example 6.

EXAMPLE 10

A cathode material, $LiFePO_4$, was synthesized by the following procedure.

To a mixture of $Fe_3(PO_4)_2.8H_2O$ (product of Soegawa Chemical Co., Ltd.) in the same amount as in Example 8 (i.e., 5.0161 g) and $Li_3PO_4$ (product of Wako Pure Chemical Industries, Ltd.) in the same amount as in Example 8 (i.e., 1.1579 g), ethanol was added about 1.5 times in volume as much as the mixture. The thus-obtained mixture was pulverized and mixed in a planetary ball mill equipped with zirconia pots and zirconia beads of 2 mm in diameter, and then dried at 50° C. under reduced pressure. After the drying, the pulverized mixture was placed in an alumina crucible and at first, was subjected to pre-calcination at 400° C. for 5 hours while feeding a mixed gas of 5% by volume of hydrogen ($H_2$) and 95% by volume of argon (Ar) at a flow rate of 200 ml/minute. The pre-calcined raw materials (4.4762 g) were taken out, to which dextrin (0.5358 g; product of Wako Pure Chemical Industries, Ltd.) was added. The resulting mixture was pulverized in an agate mortar, and was further subjected to main calcination at 725° C. for 10 hours in the same atmosphere (the feeding of the mixed gas was continued from before the start of heating, during the calcination, and further, until after the mixture was allowed to cool down). The thus-synthesized cathode material was identified by powder X-ray diffraction to be $LiFePO_4$ having the olivine-type crystal structure. On the other hand, crystal diffraction peaks ascribable to oxidized-form impurities such as $\alpha$-$Fe_2O_3$ and $FePO_4$ and other impurities were not observed.

It was determined by an elemental analysis that carbon formed by pyrolysis of the dextrin was contained as much as 3.43% by weight. Nonetheless, no diffraction peak ascribable to graphite crystals was observed by X-ray diffraction and therefore, the cathode material was gathered to be in the form of a composite material with amorphous carbon. Further, the crystallite size was 170 nm.

Using that cathode material, a cathode pellet and a coin-type lithium secondary battery were produced under similar conditions as in Example 6.

The secondary battery with the cathode material obtained and incorporated therein as described above was repeatedly charged and discharged at current densities of 0.5 mA/cm$^2$ and 1.6 mA/cm$^2$ of apparent area of the cathode pellet, respectively, in an operating voltage range of from 3.0 V to 4.0 V. The average initial discharge capacities in the $1^{st}$ to $20^{th}$ cycles were as shown in Table 4 (the initial discharge capacities were standardized based on the weight of the cathode active material in the product).

Figure 6:
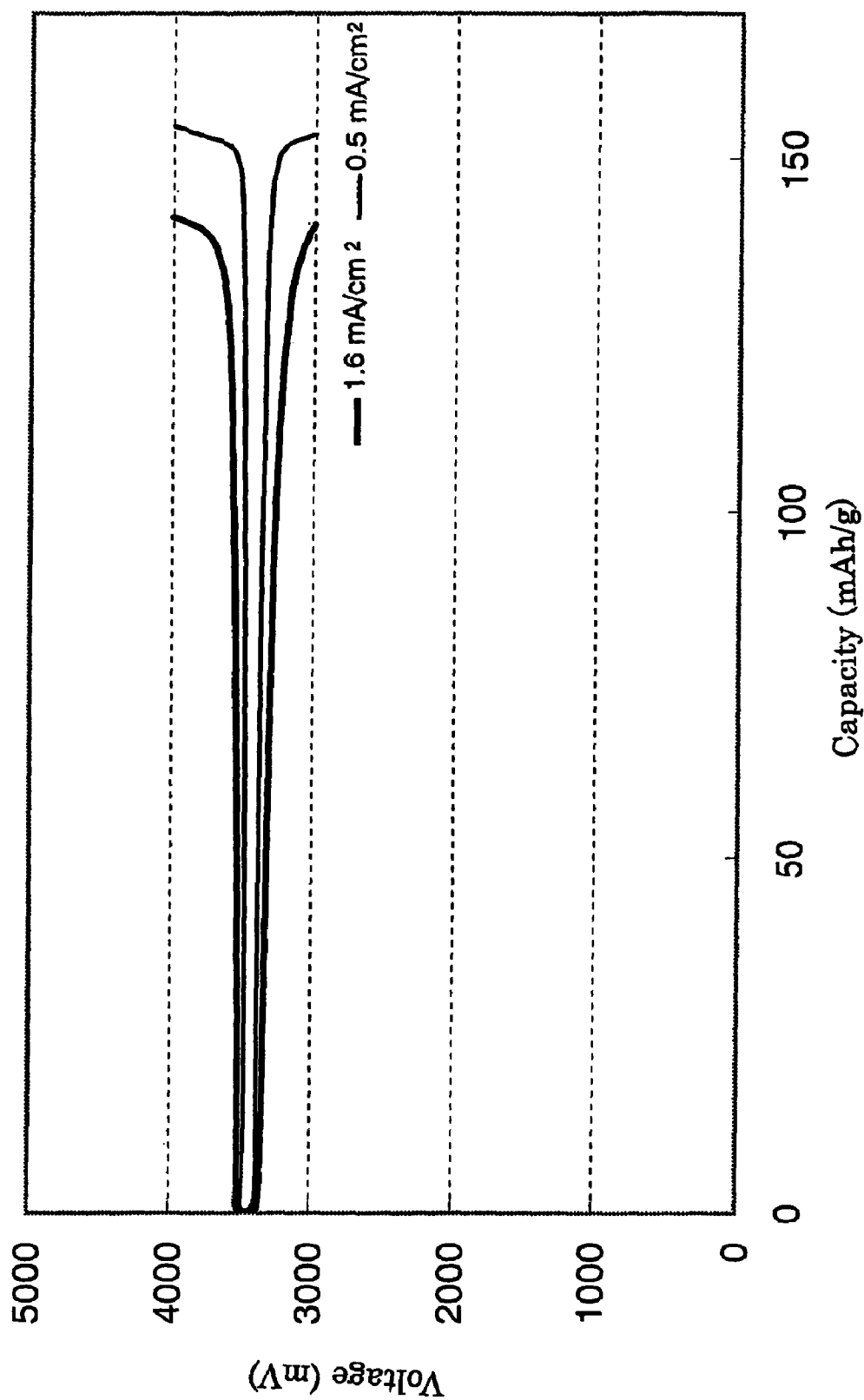
FIG. 6 is a graphic diagram showing the charge/discharge characteristics of a coin-type secondary battery obtained in Example 10.

The charge/discharge characteristics of the coin-type lithium secondary battery in the $10^{th}$ cycle under the above-described conditions are shown in FIG. 6.

EXAMPLE 11

Olivine-type $LiFePO_4$ was obtained as a cathode material by a similar synthesis process as in Example 10 except that the pre-calcination and main calcination were conducted by adding dextrin to the raw materials before the pre-calcination.

Specifically, dextrin (0.6600 g) was added to a mixture of $Fe_3(PO_4)_2.8H_2O$ (product of Soegawa Chemical Co., Ltd.) and $Li_3PO_4$ (product of Wako Pure Chemical Industries, Ltd.) the amounts of which were the same as in Example 10. By using the planetary ball mill, the thus-obtained mixture was pulverized and mixed. After drying, the pulverized mixture was subjected to pre-calcination in an alumina crucible at 400° C. for 5 hours in the same atmosphere and subsequent to pulverization, further to main calcination at 725° C. for 10 hours in the same atmosphere. No substantial difference was observed in X-ray diffraction between the thus-obtained cathode material and that obtained in Example 10, and the crystallite size was 165 nm, which was not substantially different from that in Example 10. It has also been found from an elemental analysis that carbon formed by pyrolysis of dextrin was contained as much as 3.33% by weight and that the amount of deposited carbon was not substantially different from that in Example 10.

Figure 7:
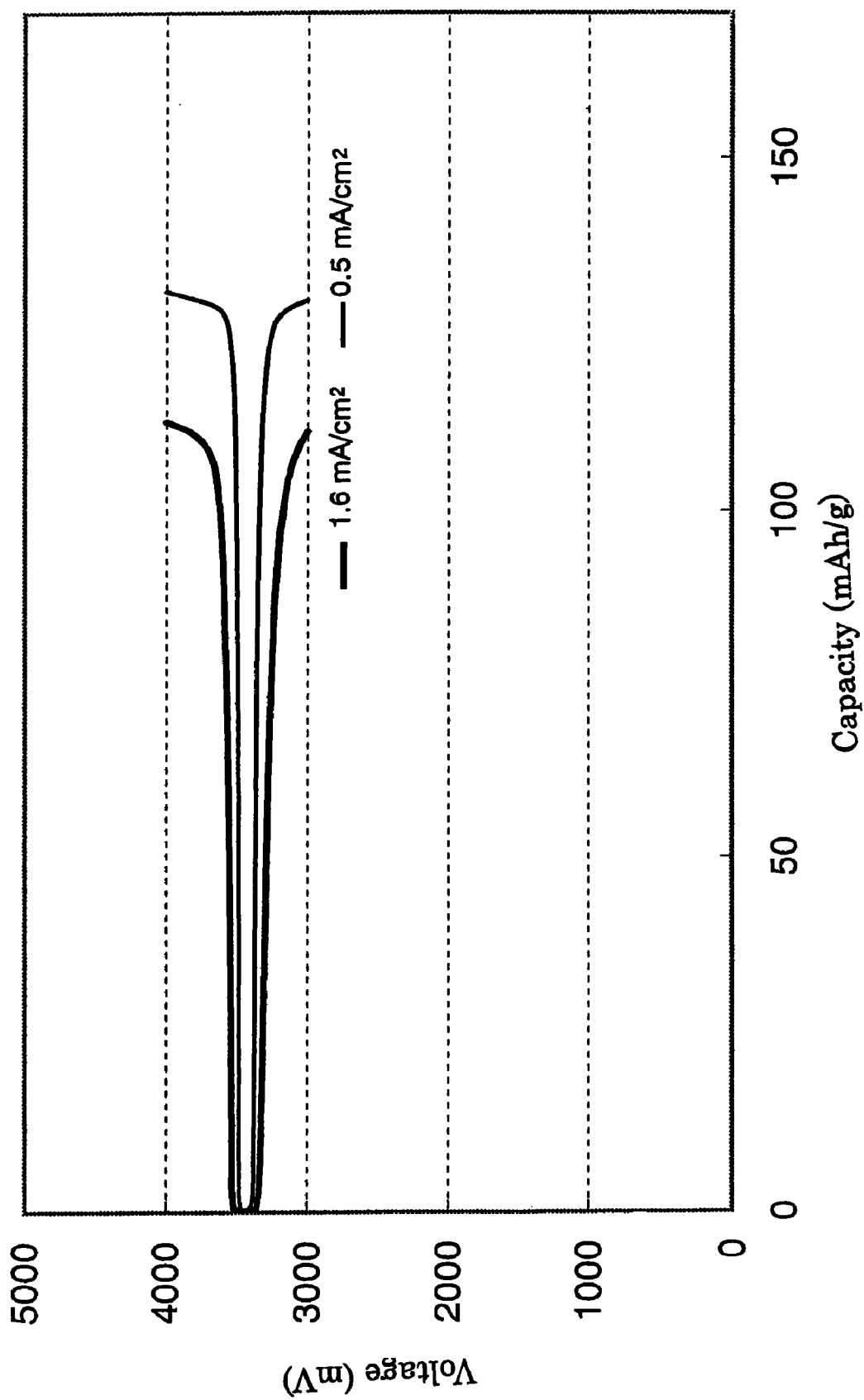
FIG. 7 is a graphic diagram showing the charge/discharge characteristics of a coin-type secondary battery obtained in Example 11.

Using the cathode material, a coin-type lithium secondary battery of a similar construction as in Example 10 was fabricated, and a charging/discharging cycle test was conducted in a similar manner as in Example 10. The average initial discharge capacities in the $1^{st}$ to $20^{th}$ cycles are also shown in Table 4. Further, the charge/discharge characteristics of the coin-type lithium secondary battery in the $10^{th}$ cycle are shown in FIG. 7.

As shown in Table 4, the initial discharge capacities in Example 11 were relatively good, and therefore, the effects brought about owing to the addition of hydrogen and dextrin can be recognized, but it is understood that the initial discharge capacities increased further in Example 10. Comparing FIG. 6 with FIG. 7, the product of Example 10 in which dextrin was added to the raw materials after their pre-calcination had flat voltage regions of charge and discharge voltages up to a value closer to the theoretical capacity (170 mAh/g) than that of Example 11 in which dextrin was added to the raw materials before the pre-calcination, and further, the difference between the charge voltage and the discharge voltage was sufficiently small in Example 11. It is, therefore, understood that the secondary battery of Example 11 was excellent in charge/discharge characteristics. Similar reasons are considered to be applicable to these outcomes as in Example 6.

EXAMPLE 12

A cathode material, $LiFePO_4$, was synthesized by the following procedure.

To $FeC_2O_4.2H_2O$ (5.0532g), $(NH_4)_2HPO_4$ (3.7094g) and $LiOH.H_2O$ (1.1784 g), acetylene black [0.1220 g; "Denka Black" (registered trademark), product of Denki Kagaku Kogyo K.K.; 50% pressed product] was added, followed by pulverization and mixing in an automated agate mortar. The thus-pulverized mixture was placed in an alumina crucible and at first, was subjected to pre-calcination at 400° C. for 5 hours while feeding a mixed gas of 5% by volume of hydrogen ($H_2$) and 95% by volume of argon (Ar) at a flow rate of 200 ml/minute. The thus-obtained pre-calcined mixture was taken out and pulverized in an agate mortar, and was further subjected to main calcination at 775° C. for 10 hours in the same atmosphere (the feeding of the mixed gas was continued from before the start of heating, during the calcination, and even after the mixture was allowed to cool down). The thus-synthesized cathode material was identified by powder X-ray diffraction to be $LiFePO_4$ having the olivine-type crystal structure. On the other hand, crystal diffraction peaks ascribable to oxidized-form impurities such as $\alpha\text{-}Fe_2O_3$ and $FePO_4$ were not observed at all.

It was determined by an elemental analysis that carbon derived from acetylene black was contained as much as 2.84% by weight. Further, the crystallite size was 111 nm.

Using that cathode material, a cathode pellet and a coin-type lithium secondary battery were produced under similar conditions as in Example 6.

The secondary battery with the cathode material obtained and incorporated therein as described above was repeatedly charged and discharged at current densities of 0.5 $mA/cm^2$ and 1.6 $mA/cm^2$ of apparent area of the cathode pellet, respectively, in an operating voltage range of from 3.0 V to 4.0 V. The average initial discharge capacities in the $1^{st}$ to $20^{th}$ cycles were as shown in Table 4 (the initial discharge capacities were standardized based on the weight of the cathode active material in the product).

EXAMPLE 13

Olivine-type $LiFePO_4$ was obtained as a cathode material by a similar synthesis process as in Example 12 except that the pre-calcination and main calcination were conducted by adding the same acetylene black to the raw materials after the pre-calcination.

Described specifically, $FeC_2O_4.2H_2O$ and $(NH_4)_2HPO_4$, which were in the same amounts as in Example 12, and $LiOH.H_2O$ (1.1784 g) were pulverized and mixed in an automated agate mortar. The thus-pulverized mixture was placed in an alumina crucible and at first, was subjected to pre-calcination at 400° C. for 5 hours while feeding a mixed gas of 5% by volume of hydrogen ($H_2$) and 95% by volume of argon (Ar) at a flow rate of 200 ml/minute. To the raw materials (2.1856 g) taken out after their pre-calcination, acetylene black (0.0707 g; 50% pressed product) was added. The resulting mixture was pulverized and mixed in an automated agate mortar, and then subjected to main calcination at 775° C. for 10 hours in the same atmosphere (the feeding of the mixed gas was continued from before the start of heating, during the calcination, and even after the mixture was allowed to cool down). The thus-synthesized cathode material was identified by powder X-ray diffraction to be $LiFePO_4$ having the olivine-type crystal structure. On the other hand, crystal diffraction peaks ascribable to oxidized-form impurities such as $\alpha\text{-}Fe_2O_3$ and $FePO_4$ were not observed.

It was determined by an elemental analysis that carbon derived from acetylene black was contained as much as 2.76% by weight. Further, the crystallite size was 122 nm. Accordingly, there were no significant differences in carbon content and crystallite size from Example 12.

Using that cathode material, a cathode pellet and a coin-type lithium secondary battery were produced under similar conditions as in Example 12, and a charging/discharging cycle test was conducted in a similar manner as in Example 12. The average initial discharge capacities in the $1^{st}$ to $20^{th}$ cycles are also shown in Table 4.

As shown in Table 4, the initial discharge capacities in Example 12 were relatively good, and the effects of acetylene black as conductive carbon and that brought about by the addition of hydrogen can be recognized. Further, the initial discharge capacities in Example 12 were larger than those in Example 13. It is thus understood that, when acetylene black which has already been in an infusible form and has already been carbonized is added, higher cathode performance is available by conducting main calcination with the acetylene black added to the raw materials before pre-calcination.

TABLE 4

| | Initial discharge capacity (mAh/g) (0.5 $mA/cm^2$) | Initial discharge capacity (mAh/g) (1.6 $mA/cm^2$) |
|---|---|---|
| Example 6 (3-component feed: refined coal pitch with softening point of 200° C. added after pre-calcination: calcined in 5% $H_2$) | 153 | 137 |
| Example 7 (3-component feed: refined coal pitch with softening point of 200° C. added before pre-calcination: calcined in 5% $H_2$) | 148 | 131 |
| Example 8 (2-component feed: refined coal pitch with softening point of 200° C. added after pre-calcination: calcined in 5% $H_2$) | 153 | 130 |
| Example 9 (2-component feed: refined coal pitch with softening point of 200° C. added before pre-calcination: calcined in 5% $H_2$) | 140 | 117 |
| Example 10 (2-component feed: dextrin added after pre-calcination: calcined in 5% $H_2$) | 154 | 138 |
| Example 11 (2-component feed: dextrin added before pre-calcination: calcined in 5% $H_2$) | 131 | 111 |
| Example 12 (3-component feed: acetylene black added before pre-calcination: calcined in 5% $H_2$) | 138 | 108 |
| Example 13 (3-component feed: acetylene black added after pre-calcination: calcined in 5% $H_2$) | 123 | 93 |

EXAMPLE 14

A cathode material, $LiFePO_4$, was synthesized by the following procedure.

To $FeC_2O_4.2H_2O$ (5.0532 g), $(NH_4)_2HPO_4$ (3.7094 g) and $LiOH.H_2O$ (1.1784 g), acetylene black [0.0610 g; "Denka Black" (registered trademark), product of Denki Kagaku Kogyo K.K.; 50% pressed product] was added, followed by pulverization and mixing in an automated agate mortar. The thus-pulverized mixture was placed in an alumina crucible and at first, was subjected to pre-calcination at 400° C. for 5 hours while feeding a mixed gas of 5% by volume of hydrogen ($H_2$) and 95% by volume of argon (Ar) at a flow rate of 200 ml/minute. To the raw materials (2.2430 g) taken out after the pre-calcination, refined coal pitch (0.0576 g) the softening point of which was 200° C. was added. The resulting mixture was pulverized and mixed in an agate mortar, and was then subjected to main calcination at 775° C. for 10 hours in the same atmosphere (the feeding of the mixed gas was continued from before the start of heating, during the calcination, and even after the mixture was allowed to cool down). The thus-synthesized cathode material was identified by powder X-ray diffraction to be $LiFePO_4$ having the olivine-type crystal structure. On the other hand, crystal diffraction peaks ascribable to oxidized-form impurities such as $\alpha$-$Fe_2O_3$ and $FePO_4$ were not observed at all.

It was determined by an elemental analysis that carbon formed by pyrolysis of the refined coal pitch and carbon derived from acetylene black were contained as much as 3.27% by weight in total. Further, the crystallite size was 74 nm.

Using that cathode material, a cathode pellet and a coin-type lithium secondary battery were produced under similar conditions as in Example 6.

The secondary battery with the cathode material obtained and incorporated therein as described above was repeatedly charged and discharged at current densities of 0.5 mA/cm$^2$ and 1.6 mA/cm$^2$ of apparent area of the cathode pellet, respectively, in an operating voltage range of from 3.0 V to 4.0 V. The average initial discharge capacities in the $1^{st}$ to $20^{th}$ cycles were as shown in Table 5 (the initial discharge capacities were standardized based on the weight of the cathode active material in the product). It has been indicated that as demonstrated above, the addition of acetylene black as conductive carbon before pre-calcination and the addition of refined coal pitch as a conductive carbon precursor after the pre-calcination can provide a cathode material which makes it possible to provide a secondary battery having an increased discharge capacity and improved cathode performance.

TABLE 5

| | Initial discharge capacity (mAh/g) (0.5 mA/cm$^2$) | Initial discharge capacity (mAh/g) (1.6 mA/cm$^2$) |
|---|---|---|
| Example 14 (3-component feed: acetylene black added before pre-calcination, refined coal pitch with softening point of 200° C. added after pre-calcination: calcined in 5% $H_2$) | 154 | 139 |

The present invention has been described above based on the various embodiments, but the present invention shall not be limited to or by the above-described embodiments, and is applicable to other embodiments within the scope of the present invention as defined in the claims.

INDUSTRIAL APPLICABILITY

Cathode materials available by the process of the present invention can be used, for example, as cathode materials for secondary batteries represented by metal lithium batteries, lithium ion batteries and lithium polymer batteries. Further, secondary batteries making use of the cathode material are also expected to find utility as power sources required to generate large currents, for example, for driving vehicles such as hybrid electric vehicles and for operating mobile telephones.

What is claimed is:

1. A process for producing a secondary battery cathode material, which includes an alkali metal, a transition metal and oxygen, comprising the step of:
   calcining pulverized and mixed raw materials, wherein:
   said calcination step includes a first stage performed at a temperature that is raised from room temperature to a first calcination temperature between 300° C. and 450° C., and a second stage performed at a temperature that is raised from room temperature to a second calcination temperature between 500° C. and 800° C., the calcination step being completed at the second temperature,
   wherein the second stage is carried out after adding a substance which can form conductive carbon by pyrolysis to said raw materials, the substance being added to said raw materials after completing the first stage of said calcination step
   wherein said first and second stages are performed substantially in the absence of oxygen gas, in a gas atmosphere comprising an inert gas,
   and wherein one or more substances, which are selected from the group consisting of hydrogen, water and water vapor are added to the raw materials together with the inert gas at least during the second stage while the calcination temperature is 500° C. or higher.

2. The process according to claim 1, wherein said substance which can form conductive carbon by pyrolysis is a bitumen.

3. The process according to claim 2, wherein said bitumen is a coal pitch having a softening point in a range of from 80° C. to 350° C. and a pyrolytic weight-loss initiation temperature in a range of from 350° C. to 450° C. and capable of depositing conductive carbon by pyrolysis and calcination at a temperature of from 500° C. to 800° C.

4. The process according to claim 1, wherein said substance which can form conductive carbon by pyrolysis is a saccharide.

5. The process according to claim 4, wherein said saccharide undergoes decomposition in a temperature range of from 250° C. and higher but lower than 500° C., takes an at least partially fused form once in a course of heating from 150° C. to decomposition, and further, forms conductive carbon by pyrolysis and calcination in a temperature range of from 500° C. and higher but not higher than 800° C.

6. The process according to claim 1, wherein said cathode material is a substance represented by a formula of $M_{(1)a}M_{(2)x}A_yO_z$ wherein $M_{(1)}$ represents Li or Na; $M_{(2)}$ represents Fe(II), Co(II), Mn(II), Ni(II), V(II), or Cu (II); A represents P or S; a stands for a number selected from 0 to 3 (exclusive of 0); x stands for a number selected from 1 to 2; y stands for a number selected from 1 to 3; and z stands for a number selected from 4 to 12, or a complex thereof.

7. The process according to claim 1, wherein said cathode material is a substance represented by a formula of $Li_qFePO_4$, $Li_qCoPO_4$ or $Li_qMnPO_4$, wherein q stands for a number selected from 0 to 1 (exclusive of 0), or a complex thereof.

8. The process according to claim 1, wherein said inert gas is selected from the group consisting of argon (Ar), nitorogen ($N_2$), and helium (He).

9. The process according to claim 8, wherein said first and second stages are performed in a gas atmosphere, wherein hydrogen or water vapor is added to said inert gas, and the range of the volumetric concentration of the hydrogen or water vapor is set at 0.1% or higher but 20% or lower.

* * * * *